US007289778B2

(12) United States Patent
Sasaki

(10) Patent No.: US 7,289,778 B2
(45) Date of Patent: Oct. 30, 2007

(54) POWER CIRCUIT AND COMMUNICATION DEVICE PROVIDED WITH SAME

(75) Inventor: Hiroshi Sasaki, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 713 days.

(21) Appl. No.: 10/684,679

(22) Filed: Oct. 15, 2003

(65) Prior Publication Data

US 2004/0155634 A1 Aug. 12, 2004

(30) Foreign Application Priority Data

Feb. 7, 2003 (JP) ............................. 2003-030454
Jun. 26, 2003 (JP) ............................. 2003-183617

(51) Int. Cl.
*H04B 1/04* (2006.01)

(52) U.S. Cl. .................. 455/127.5; 455/574; 330/136; 323/263

(58) Field of Classification Search ............. 455/127.1, 455/127.2, 115.1, 232.1, 245.1, 522, 550.1, 455/571–574, 127.5; 323/247, 259, 263; 330/127, 133, 136
See application file for complete search history.

(56) References Cited

U.S. PATENT DOCUMENTS

| 5,416,441 A * | 5/1995 | Nagano ....................... 330/129 |
| 5,587,250 A | 12/1996 | Thomas et al. |
| 2002/0025789 A1* | 2/2002 | Hayashihara ................ 455/115 |
| 2003/0052645 A1* | 3/2003 | Sasaki ......................... 320/110 |
| 2003/0114127 A1* | 6/2003 | Baldwin .................. 455/245.1 |
| 2003/0224743 A1* | 12/2003 | Okada et al. ............. 455/127.2 |

FOREIGN PATENT DOCUMENTS

| EP | 0 902 547 | 3/1999 |
| GB | 2 352 344 | 1/2001 |
| JP | 50-153228 | 12/1975 |
| JP | 4-315320 | 11/1992 |
| JP | 06-291710 | 10/1994 |
| JP | 2002-064624 | 2/2002 |
| JP | 2002-135995 | 5/2002 |
| WO | WO 01/89058 | 11/2001 |

OTHER PUBLICATIONS

European Search Report dated Jun. 8, 2004.
The Office Action issued by the Japanese Patent Office on Aug. 22, 2006 with translation, pp. 1 to 3.
The Office Action issued by the Japanese Patent Office on Jul. 3, 2007 with a translation, pp. 1 to 4.

* cited by examiner

*Primary Examiner*—Edward F. Urban
*Assistant Examiner*—Nhan T. Le
(74) *Attorney, Agent, or Firm*—Whitham Curtis Christofferson & Cook, PC

(57) ABSTRACT

A power circuit in a battery powered portable communication terminal, having a battery and a transmission power amplifier for TDMA (Time Division Multiple Access) or TDD (Time Division Duplex) signals includes a power accumulator, a battery output current limiter, and a control circuit to control the current limiter and to connect the power accumulator to the battery and to the transmission power amplifier depending on whether the transmission power amplifier is transmitting a signal burst. The control circuit controls the battery to charge the power accumulator during a non-burst period. During burst periods, when the transmission power amplifier requires higher power, the control circuit connects the power accumulator to the transmission power amplifier, to supplement the current-limited current provided by the battery and provide a total current to the power amplifier that is higher than the battery output current.

22 Claims, 17 Drawing Sheets

POWER CIRCUIT AND COMMUNICATION DEVICE PROVIDED WITH SAME

BACKGROUND OF THE INVENTION

1. Field of the Invention

The present invention relates to a power circuit and a communication device provided with the power circuit and more particularly to the power circuit being suitably used in portable cellular phones or a like employing a TDMA (Time Division Multiple Access) or TDD (Time Division Duplex) communication method and to the communication device provided with the power circuit.

The present application claims priorities of Japanese Patent Application No. 2003-030454 filed on Feb. 7, 2003 and No. 2003-183617 filed on Jun. 26, 2003, which are hereby incorporated by reference.

2. Description of the Related Art

In a conventional portable communication device (for example, a portable cellular phone) employing a TDMA or TDD communication method, a transmission signal having a burst period and non-burst period occurring alternately in a repeated manner, after having been amplified by a transmission power amplifier, is transmitted as a transmission radio wave. During the burst period, since the transmission power amplifier transmits a radio wave, power consumption is large and, during the non-burst period, since a radio wave receiving section of the portable cellular phone receives a radio wave, power consumption is small. Therefore, a load current increases or decreases in a burst manner. Moreover, power for the transmission power amplifier is ordinarily supplied from a battery. The battery discharges in synchronization with a repeating cycle of the burst period and non-burst period.

The battery supplies power also to internal circuits such as a CPU (Central Processing Unit) or a like in the portable cellular phone, however, if a voltage of the battery becomes below a lower limit value of an operating voltage of the CPU or a like even momentarily, the CPU or a like is put in a frozen state, causing the portable cellular phone to be inoperable. Therefore, whether or not a residual capacity of the battery exists is judged by detecting a lowest voltage value occurring in various operating states and, by setting a somewhat high terminating voltage obtained by providing a margin based on prediction of a momentary heavy loaded state. Under such conditions, research and development are being conducted to use the portable cellular phone for a longer period of time by expanding a capacity of a battery or by utilizing a DC-DC (Direct Current-Direct Current) converter circuit. Moreover, the TDMA communication method includes a PDC (Personal Digital Cellular) method being used domestically in Japan, a GSM (Global System for Mobile Communications) and/or GPRS (General Packet Radio Service) methods being used in Europe or a like.

Such the conventional portable cellular phone, as shown in FIG. 15, includes a transmission power amplifier 1, a circuit block 2, and a power circuit 3. The transmission power amplifier 1 is made up of an amplifier (AMP) 11, a capacitor 12, an amplifier (AMP) 13, a capacitor 14, an amplifier (AMP) 15, and a bias circuit 16. Each of the amplifiers 11, 13, and 15 is constructed of a bipolar transistor, a MOS (Metal Oxide Semiconductor) transistor, or a like. The bias circuit 16 generates a bias voltage to normally operate these amplifiers 11, 13, and 15. Moreover, each of the transmission power amplifier 1 and circuit block 2 has a lower limit value of an operating voltage required to be operated normally. In the transmission power amplifier 1, a transmission signal RFIN having a burst period and a non-burst period occurring alternately in a repeated manner, which correspond to the GSM communication method, is input to the amplifier 11. The transmission signal RFIN is amplified by the amplifier 11 and an output signal K is then output from the amplifier 11. The output signal K, after its DC (Direct Current) component has been intercepted by the capacitor 12, is input to the amplifier 13 where it is amplified and is output as an output signal M from the amplifier 13. The output signal M, after its DC component has been intercepted by the capacitor 14, is input to the amplifier 15 where it is amplified and a radio wave signal RFOUT as a transmission radio wave from the amplifier 15 is output.

The circuit block 2 includes various circuits each performing specified operations other than amplifying operations to be performed by the transmission power amplifier 1 using almost constant power to be consumed. The various circuits include, for example, a DC-DC converter 21, loads 22 other than the transmission power amplifier 1, or a like, and a lower limit value of a voltage for the specified operations to be performed by each of the various loads 22 is set to be higher than a lower limit value of the voltage for operations to be performed by the transmission power amplifier 1. The DC-DC converter 21 boosts or lowers an output voltage of the power circuit 3. The loads 22 other than the transmission power amplifier 1 includes, for example, a power source for a microcomputer, a power source for a DSP (Digital Signal Processor), a power source for a SIM (Subscriber Identity Module) card, a power source for a memory, a power source for human interface devices (for example, a voice device, an input/output device, an image pick-up device, or a like) and each of the loads 22 is so configured that an output voltage of the power circuit 3 is directly applied to the loads 22 which can operate at the output voltage of the power circuit 3 and the output voltage of the power circuit 3, after being boosted or lowered by the DC-DC converter 21, is applied to the loads 22 which cannot operate at the output voltage of the power circuit 3 and require conversion of the output voltage.

The power circuit 3 is made up of a battery 31, a power management circuit 32, a battery charging circuit 33, and a power bypass condenser 34. The battery 31 is a lithium ion battery and is made up of a single cell 35, an internal resistor 36, and a protective circuit 37. The power management circuit 32 monitors an output voltage of the battery 31 so as to detect a residual capacity and, when the residual capacity of the battery 31 becomes low and when the output voltage reaches a specified reference level having been set to be more than a lower limit value of an operating voltage of the circuit block 2, produces a control signal to display, for example, an alarm indicating a need for charging to notify a fact that the output voltage of the battery 31 has dropped. The battery charging circuit 33 is connected to an outer power source (not shown) charges the battery 31 under specified charging conditions according to a control signal fed from the power management circuit 32. The power bypass condenser 34 delays increasing or decreasing of an output current of the battery 31 occurring at the start time or end time of the burst period.

FIG. 16 is a time chart explaining operations of the conventional portable cellular phone shown in FIG. 15. FIG. 17 is a diagram showing a tolerance of a discharging voltage of the battery 31 shown in FIG. 15, reference for detection of a residual capacity of the battery 31 having been set to the management circuit shown in FIG. 15, a tolerance of an operating voltage of a transmission power amplifier 1 shown in FIG. 15, and a tolerance of an operating voltage of the circuit block 2 shown in FIG. 15.

Next, operations of the portable cellular phone shown in FIG. 15 are described below by referring to FIGS. 16 and 17. As shown in FIG. 15, since the transmission power amplifier 1 is connected to the power circuit 3, an output voltage of the battery 31 becomes equal to an operating voltage of the transmission power amplifier 1. First, at time tα, when a signal transmitting operation is started and the transmission burst period begins, a current to be consumed by the transmission power amplifier 1 sharply increases from a current value 0 A to a current value IPA. An output current of the battery 31 also increases from a current value IB0 to a current value IBmax in synchronization with starting of the transmission burst period, however, increasing of the current is delayed due to a surge absorbing action caused by discharging of the power bypass condenser 34. This serves to suppress a fluctuation of an output voltage of the battery 31 caused by starting of the transmission burst period. An output voltage of the battery 31, due to an increase of its output current occurring at the start time of the transmission burst period and due to existence of a resistance component by serial connection between the internal resistor 36 and the protective circuit 37, drops by a voltage value ΔVBRx (=VB0) from a voltage value VB0 (being equal to an operating voltage VPA0 of the transmission power amplifier 1).

During a period Tβ, that is, during the transmission burst period, since the transmission power amplifier 1 is continuing transmission operations, a current to be consumed remains constant at a level of the current value IPA. The output current of the battery 31, since the delay caused by the power bypass condenser 34 has disappeared, becomes stable at a level of the current value IBmax being a sum of a current consumed by the transmission power amplifier 1 to a current (almost being constant and being equal to the current value IB0) consumed by the circuit block 2. The output voltage of the battery 31, due to a voltage drop corresponding to an electrostatic capacity component of the battery 31 induced by an output current with the value of IBmax, is lowered by a voltage value ΔVBCx (=ΔVCX). Therefore, an amount of change in the output voltage of the battery 31 at an end of the period Tβ, since an amount of voltage drop of ΔVBCx is added to a voltage value ΔVBRx occurring at the time tα, becomes ΔVBx (=ΔVPAx=ΔVBRx+ΔVBCx) and the output voltage of the battery 31 drops from the voltage value VB0 to a voltage value VB1 (=VPA1).

At the time tβ, when the transmission operation is terminated and the transmission burst period ends, the current consumed by the transmission power amplifier 1 sharply lowers from the current value IPA to almost 0A. The output current of the battery 31 decreases to a level of a current (with a value of IB0) consumed by the circuit block 2 in synchronization with ending of the transmission burst period, however, decreasing of the output current is delayed by the surge absorbing action caused by charging of the power bypass condenser 34. This suppresses a fluctuation of the output voltage of the battery 31 caused by ending of the transmission burst period. The output voltage VB1 of the battery 31, since the voltage drop caused by existence of a resistance component by serial connection between the internal resistor 36 and protective circuit 37 decreases in synchronization with ending of the transmission burst period, is boosted by a voltage value ΔVBRx (=ΔVRx).

During a period Tα, that is, during the receiving non-burst period, since the radio wave receiving section of the portable cellular phone is continuing receiving operations and the transmission power amplifier 1 does not operate, a current consumed by the transmission power amplifier 1 is almost 0A. The output current of the battery 31, since the delay caused by the power bypass condenser 34 has disappeared, is stable at a level of the current value IB0 which is a current to be consumed by the circuit block 2. The output of the battery 31, since its output current has sharply decreased from the current value IBmax to the current value IB0, is boosted, based on a time constant, due to existence of a resistance component by serial connection between the internal resistor 36 and protective circuit 37 and due to an electrostatic capacity component of the battery 31.

Then, these voltages and currents are again put into the state that has occurred at the time tα and, thereafter, same operations are repeated in order of the time tα, period Tβ, time tβ, period Tα, time tα, . . . . Thus, by a current consumed by the transmission power amplifier 1 during the transmission burst period, an amount of change in the output voltage of the battery 31 becomes a voltage value ΔVBx and the output voltage of the battery 31 drops from the voltage value VB0 occurring during the receiving non-burst period to the voltage value VB1 which is a lowest level during the transmission burst period. If this voltage value VB1 becomes below a lower limit value of an operating voltage of the internal circuit such as the CPU in the portable cellular phone even momentarily, since the portable cellular phone becomes inoperable, a residual life of the battery 31 is judged based on this voltage value VB1.

When a telephone speech is made using the portable cellular phone, for example, of the GSM type being typical of the TDMA-type portable cellular phone, a voltage value ΔVBx that can be obtained by simulation using following conditions becomes about 300 mV.

Simulation conditions;

Resistance of the internal resistor 36; 150 mΩ

Transmission burst period; 0.5 msec

Receiving non-burst period; 4.5 msec

Output current of the battery 31;

IBmax; 2.1 A,

IB0; 0.1 A.

ΔVBRx=0.15·(2.1−0.1)=0.3 V

ΔVBCx=(0.0005·2.1)/C>0 where "C" is electrostatic capacity of the battery 31.

∴ ΔVBx=ΔVBRx+ΔVBCx>300 mV

That is, when the output of the battery 31 is, for example, 3.5V during the receiving non-burst period, it becomes 3.2V or less during the transmission burst period and, since it reaches the level that an alarm indicating a need for charging is issued according to the reference for detection of a residual capacity of the battery 31 shown in FIG. 17, a notification is provided by the power management circuit 32 informing that the output of the battery 31 has dropped.

As shown in FIG. 17, a tolerance of an operating voltage of the transmission power amplifier 1 is 4.2V to 2.7V, a tolerance of an operating voltage of the circuit block 2 is 4.2V to 3.0V and there is a difference of about 0.3V (ΔVM) in the lower limit values in the operating voltage between the transmission power amplifier 1 and the circuit block 2. A reason for this is that the transmission power amplifier 1, since it is constructed of analog circuits, is operable even at a comparatively low voltage, while the circuit block 2, since it is constructed of a CPU and/or digital circuits, is inoperable at a low voltage.

Moreover, in addition to the portable cellular phone described above, a radio communication device as one of examples of the technology described above is disclosed in Japanese Patent Application Laid-open No. Hei 04-315320, in which a capacitor is charged by a battery to have a voltage of 10V using a voltage boosting device and, during a transmission burst period, a switching unit is closed to allow power to be applied by the capacitor to a power amplifier. At this point, a burst signal is amplified by the power amplifier and is transmitted and, during a non-burst period, a switching unit is opened to allow the capacitor to be charged.

However, such the conventional technologies as described above have following problems. That is, even if an output voltage of the battery 31 is, for example, 3.5V during the receiving non-burst period, it becomes 3.2V or less (terminating voltage) during a transmission burst period and, therefore, it reaches a level that an alarm indicating a need for charging is issued and, as a result, a notification is provided by the power management circuit 32 informing that the output voltage has dropped and, before the output voltage of the battery 31 reaches an actual terminating voltage, the conventional portable cellular phone becomes inoperable. To solve this problem, an idea is proposed that a capacity of the battery 31 is increased. However, if the capacity of the battery 31 is increased, it is made impossible to make the portable cellular phone smaller in size and lightweight, which further makes it difficult to meet market needs for the portable cellular phone which enables long-time speech and is compact and lightweight.

Moreover, in the burst radio communication device disclosed in the Japanese Patent Application Laid-open No. Hei 04-315320, power is applied to the power amplifier by the capacitor charged by the battery using the voltage boosting device. However, in many power amplifiers being presently a mainstream, a battery voltage (in the case of the lithium ion battery, it is about 3.7V on average) of the portable cellular phone is applied. Therefore, if a voltage of about 10V is applied by the capacitor, it exceeds a withstand voltage (about 5V) of a power amplifier of the portable cellular phone, which produces a fear that elements within the power amplifier may be broken. Moreover, even when a voltage fed from the capacitor is stepped down by a regulator, since DC/DC converters are used in two stages, another problem arises that power efficiency is remarkably lowered.

Also, in the disclosed burst radio communication device, the switching unit is closed during the transmission burst period and is opened during the non-burst period, however, such the method in which the capacitor is charged at an idle slot time during the non-transmission period (non-burst period) can be employed only in a device in which transmission time is comparatively short (its duty ratio being about ⅛). That is, as a ratio of transmission time becomes larger, the capacitor has to be charged in a shorter time and, when this ratio exceeds 50%, the switching unit produces an adverse effect. In recent years, functions of the portable cellular phone tend to be expanded, that is, although the conventional function is to perform only voice speech, a recent function includes transmission of data. In the portable cellular phone of the TDMA type, such the expansion of the functions causes transmission slots to increase and the ratio of transmission time to rise and, therefore, the switching unit is not effective in achieving long-time speech in the portable cellular phone.

Furthermore, one of the most important performance capabilities of portable communication devices such as portable cellular phones is to be able to provide a satisfactory size and weight that would not hinder a user from carrying them. In recent years in particular, since a folding body of a portable cellular phone is the main stream, it is requested that portable cellular phones are thin and lightweight. However, in the disclosed burst radio communication device, the voltage boosting device is a DC-DC converter made up of a coil, resistor, semiconductor, or a like, the switching unit is made up of a mechanical switching element or a semiconductor switching element, and the capacitor is about 100 mm$^3$ in size. If all these components are housed in the portable cellular phone, the portable cellular phone becomes very large and heavy, thus impairing a portability characteristic of the portable cellular phone.

SUMMARY OF THE INVENTION

In view of the above, it is an object of the present invention to provide a power circuit enabling long-time speech in portable communication devices and making them compact and lightweight and communication devices provided with the power circuit.

According to a first aspect of the present invention, there is provided a power circuit to be used in a communication device including a transmission power amplifier to amplify a transmission signal having a burst period and a non-burst period occurring alternately in a repeated manner, the power circuit including:

a power supplying unit to supply a first power to the transmission power amplifier, and a power storing section to accumulate as a second power redundancy of the first power to be supplied from the power supplying unit to the transmission power amplifier during the non-burst period, and to feed the accumulated second power to the transmission power amplifier in addition to the first power being supplied from the power supplying unit to the transmission power amplifier during the burst period.

According to a second aspect of the present invention, there is provided a communication device including:

a transmission power amplifier to amplify a transmission signal having a burst period and a non-burst period occurring alternately in a repeated manner; and a power circuit including:

a power supplying unit to supply a first power to the transmission power amplifier, and a power storing section to accumulate as a second power redundancy of the first power to be supplied from the power supplying unit to the transmission power amplifier during the non-burst period, and to feed the accumulated second power to the transmission power amplifier in addition to the first power being supplied from the power supplying unit to the transmission power amplifier during the burst period.

According to a third aspect of the present invention, there is provided a power circuit to be used in a communication device including a transmission power amplifier to amplify a transmission signal having a burst period and a non-burst period occurring alternately in a repeated manner and with a load circuit to consume power required for performing operations, the power circuit including:

a power supplying unit to supply a first power to the transmission power amplifier and the load circuit;

a voltage monitoring section to monitor an output voltage of the power supplying unit and to inform a user of a drop of the output voltage, when the output voltage lowers to a specified reference level; and a power storing section to accumulate as a second power redundancy of the first power to be supplied from the power supplying unit to the transmission power amplifier during the non-burst period, and to feed the accumulated second power to the transmission power amplifier in addition to the first power being supplied from the power supplying unit to the transmission power amplifier during the burst period.

According to a fourth aspect of the present invention, there is provided a communication device including:

a transmission power amplifier to amplify a transmission signal having a burst period and a non-burst period occurring alternately in a repeated manner;

a load circuit to consume power required for performing operations, and a power circuit including:

a power supplying unit to supply a first power to the transmission power amplifier and the load circuit;

a voltage monitoring section to monitor an output voltage of the power supplying unit and to inform a user of a drop of the output voltage, when the output voltage lowers to a specified reference level; and a power storing section to accumulate as a second power redundancy of the first power to be supplied from the power supplying unit to the transmission power amplifier during the non-burst period, and to feed the accumulated second power to the transmission power amplifier in addition to the first power being supplied from the power supplying unit to the transmission power amplifier during the burst period.

In the foregoing third aspect, a preferable mode is one wherein the transmission power amplifier has a lower limit value of a first operating voltage to normally operate the transmission power amplifier, the load circuit has a lower limit value of a second operating voltage to normally operate the load circuit, the lower limit value of the second operating voltage is set to be higher than the lower limit value of the first operating voltage, the reference level is set to be not less than the lower limit value of the second operating voltage, and the power supplying unit is made up of a battery or a direct current power source in which in which an upper limit value is imposed on a current to be output therefrom.

In the foregoing first and third aspects, a preferable mode is one wherein the power storing section is so configured as to be charged, when a voltage of the power storing section becomes lower than that of the power supplying unit during the burst period, until a voltage of the power storing section becomes almost equal to a voltage of the power supplying unit during the non-burst period occurring subsequent to the burst period.

Another preferable mode is one that wherein further includes:

a control circuit to control the first power to be fed from the power supplying unit to the transmission power amplifier, wherein the power storing section accumulates as the second power redundancy of the first power to be supplied from the power supplying unit to the transmission power amplifier under control of the control circuit during the non-burst period.

Still another preferable mode is one wherein the control circuit controls the first power to be fed from the power supplying unit to the transmission power amplifier, by controlling an output current of the control circuit, the output current being fed from the power supplying unit to the transmission power amplifier.

A further preferable mode is one wherein the output current of the control circuit is set to have a current value such that almost all amount of power needed to be consumed by the transmission power amplifier during one frame period being made up of one burst period and one non-burst period may be supplied to the transmission power amplifier.

An additional preferable mode is one wherein the power storing unit supplies the second power to the transmission power amplifier by discharging when power needed to be consumed by the transmission power amplifier during the burst period is larger than the first power being supplied under control of the control circuit, and wherein the control circuit exerts control so that the power storing section having discharged during the burst period is charged to accumulate redundancy of the first power as the second power when power to be consumed by the transmission power amplifier during the non-burst period is smaller than the first power being supplied under control of the control circuit.

still additional preferable mode is one wherein the delay device delays a rising and falling of an output current of the power supplying unit at time of start and end of the burst period.

A further preferable mode is one wherein the power storing section is made up of an electrical double layer capacitor.

Still further preferable mode is one wherein the electrical double layer capacitor has unit cells constructed as a capacitor of sheet-shaped electrical double layer structure which make up stacked cells in which arbitrary numbers of the unit cells are stacked in layer so as to be able to provide a specified withstand voltage and electrostatic capacity.

Another preferable mode is one wherein the transmission signal is transmitted by a TDMA (Time Division Multiple Access) or TDD (Time Division Duplex) communication method.

With the above configurations, since, by functions of the control circuit, an output current is supplied from the power supplying unit to the transmission power amplifier and the power storing section is charged so that power is accumulated therein and since power is applied from the power storing section to both the control circuit and the transmission power amplifier, even if power consumption of the transmission power amplifier increases during a burst period, a drop of an output voltage from the power supplying unit is small. Therefore, time required for the output voltage to reach a terminating voltage in the power supplying unit is made longer and a life of the power supplying unit can be lengthened. Also, even if the power supplying unit is put under a low-temperature circumstance and its internal resistance increases, shortening of the life of the power supplying unit can be avoided. Since the electrical double layer capacitor serving as the power storing section is made up of thin-sheet-shaped unit cells and is so constructed in a manner that a plurality of the unit cells are stacked in layer, the power circuit can be made thin, which enables mounting of the power circuit of the present invention suitably on a folding-type portable cellular phone without causing an increase in a thickness of a case of the portable cellular phone.

Also, the power circuit of the present invention does not use such the voltage boosting unit as disclosed in Japanese Patent Application Laid-open No. Hei 4-315320 and, therefore, no case occurs in which an operating voltage of the transmission power amplifier is higher than a voltage to be supplied by the power supplying unit. Moreover, the power circuit of the present invention is equipped with the control circuit to limit an output current fed from the power supplying unit to a pre-set upper limit current value, irrespective of transmitting and receiving timing in the TDMA-type or TDD-type communication system and, therefore, no effects decrease due to an increase in a ratio of transmission time.

Furthermore, the power circuit of the present invention includes the control circuit, the delay device made up of a capacitor, and power storing section having an electrical double layer capacitor, in which the capacitor and control circuit are constructed so as to be of surface mounting type and the electrical double layer capacitor is formed to be of a thin shape and, therefore, mounting of the power circuit on the folding-type portable cellular phone can be can be achieved without an increase in thickness of the folding-type portable cellular phone being presently a mainstream.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
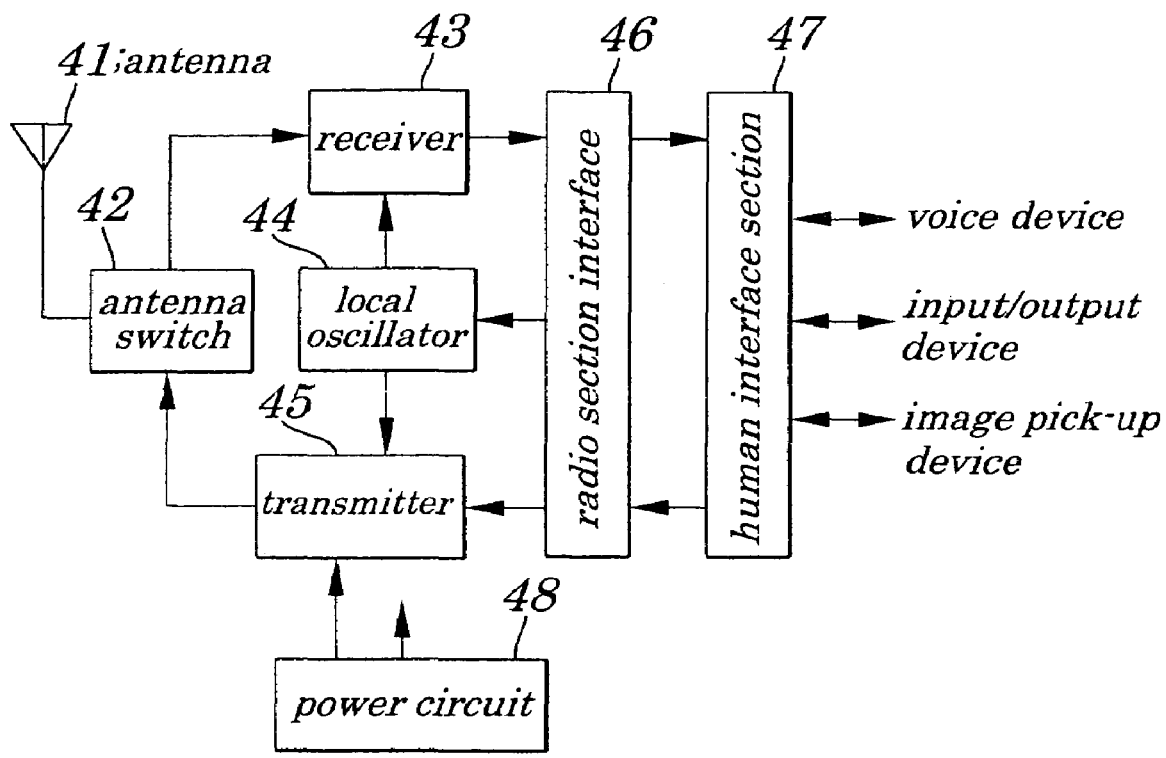
FIG. 1 is a schematic block diagram showing electrical configurations of a communication device being equipped with a power circuit of a first embodiment of the present invention.

FIG. 1 is a schematic block diagram showing electrical configurations of a communication device being equipped with a power circuit of a first embodiment of the present invention. The communication device of the first embodiment, as shown in FIG. 1, is a portable cellular phone and includes an antenna 41, an antenna switch 42, a receiver 43, a local oscillator 44, a transmitter 45, a radio section interface 46, a human interface section 47, and a power circuit 48. The antenna 41 is used to transmit and receive a radio wave to and from a radio base station (not shown) and its length is set based on a wavelength of a radio wave to be used for communication. The antenna switch 42 selects either the receiver 43 or the transmitter 45 to establish connection to the antenna 41.

The receiver 43 performs amplification and/or frequency conversion of a received signal, or a like. The local oscillator 44 generates a signal having a reference frequency required for frequency conversion of a received signal or a transmitting signal by a control signal of the radio section interface 46. The transmitter 45 makes a frequency conversion of and/or performs amplification on a transmitting signal. The radio section interface 46 encodes a received signal or a transmitting signal, transmits encoded signals to the human interface section 47, and controls the local oscillator 44 all the time. The human interface section 47 is connected to analog input/output devices including a voice device such as a speaker, microphone, or a like (not shown), an input/output device such as a keyboard, display, or a like (not shown), an image pick-up device such as a camera (not shown), and serves as a mediator between a user and the portable cellular phone. The power circuit 48 supplies power to each of the above components.

In the portable cellular phone of the embodiment, during a period of receiving a radio wave, the antenna 41 is connected to the receiver 43 through the antenna switch 42. The radio wave received by the antenna 41 is amplified by the receiver 43, and its frequencies is further down-converted by a signal fed from the local oscillator 44. The received wave of which frequency were down-converted is then transmitted to the radio section interface 46. The received wave is demodulated and decoded by the radio section interface 46 and is further transmitted to a user through the human interface section 47. Also, during a period of transmitting a radio wave, the antenna 41 is connected to the transmitter 45 through the antenna switch 42. The user inputs information that the user wants to transfer to a destination as a voice, character, or image using a microphone, keyboard, camera, or a like being connected to the human interface section 47. The input information is transmitted to the radio section interface 46 where encoding and/or modulation are performed and is then transmitted to the transmitter 45. In the transmitter 45, a transmitting signal is up-converted to become a high-frequency wave by a signal fed from the local oscillator 44 and is then amplified and transmitted as a radio wave through the antenna switch 42 from the antenna 41.

Figure 2:
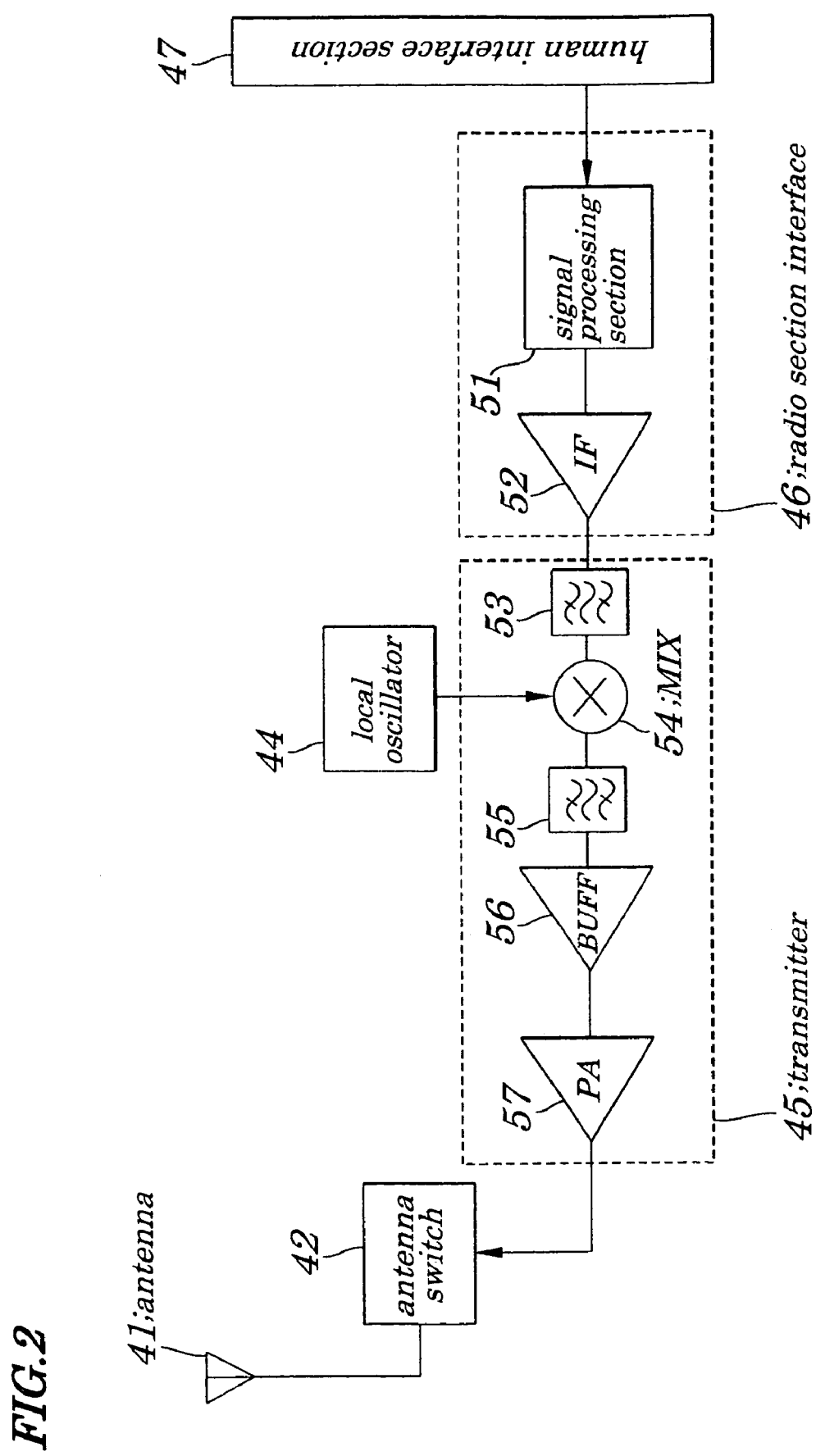
FIG. 2 is a diagram showing the antenna, antenna switch, local oscillator, transmitter, radio section interface, and human interface section, which are all taken from FIG. 1.

FIG. 2 is a diagram showing the antenna 41, antenna switch 42, local oscillator 44, transmitter 45, radio section interface 46, and human interface section 47, which are all taken from FIG. 1, and illustrates electrical configurations of main components of the transmitter 45 and radio section interface 46. The radio section interface 46, as shown in FIG. 2, is made up of a signal processing section 51 and an intermediate frequency (IF) wave section 52. The signal processing section 51 is made up of a DSP (Digital Signal Processor) or a like and performs digital signal processing such as filtering on data to be transmitted (voice signal, image signal, or a like) output from the human interface section 47. The intermediate frequency wave section 52 performs modulation and intermediate frequency wave amplification on a signal output from the signal processing section 51.

The transmitter 45 includes a band-pass filter 53, a mixer (MIX) 54, a band-pass filter 55, a buffer (BUFF) 56, and a transmission power amplifier 57. The band-pass filter 53 eliminates noises contained in a transmitting signal fed from the intermediate frequency wave section 52. The mixer 54 up-converts a frequency of the transmitting signal to become a high frequency wave by using a reference frequency fed from the local oscillator 44. The band-pass filter 55 eliminates noises contained in the transmitting signal fed from the mixer 54. The buffer 56 receives the signal having been up-converted to be a high frequency wave at high input impedance and transmits the signal at low output impedance to the transmission power amplifier 57. The transmission power amplifier 57 performs power amplification on the signal fed from the buffer 56 to use the signal as a transmission radio wave.

In the radio section interface 46, "data to be transmitted" output from the human interface section 47 is input to the signal processing section 51 in which digital signal processing is performed on the "data to be transmitted" and is then modulated by the intermediate frequency wave section 52 in which amplification is performed on an intermediate frequency wave and is output as a transmitting signal. Noises contained in the transmitting signal, which have occurred at the time of the amplification performed on the intermediate frequency wave, are removed by the band-pass filter 53 in the transmitter 45. The transmitting signal output from the band-pass filter 53 receives a reference frequency fed from the local oscillator 44 in the mixer 54 and its frequency is up-converted to become a high frequency wave. Noises contained in the transmitting signal output from the mixer 54, which have occurred by high-frequency conversion, are removed by the band-pass filter 55. The transmitting signal fed from the band-pass filter 55 is output through the buffer 56 to the transmission power amplifier 57. The signal sent out from the buffer 56 is power-amplified by the transmission power amplifier 57 and is transmitted through the antenna switch 42 from the antenna 41 as a radio wave.

Figure 3:
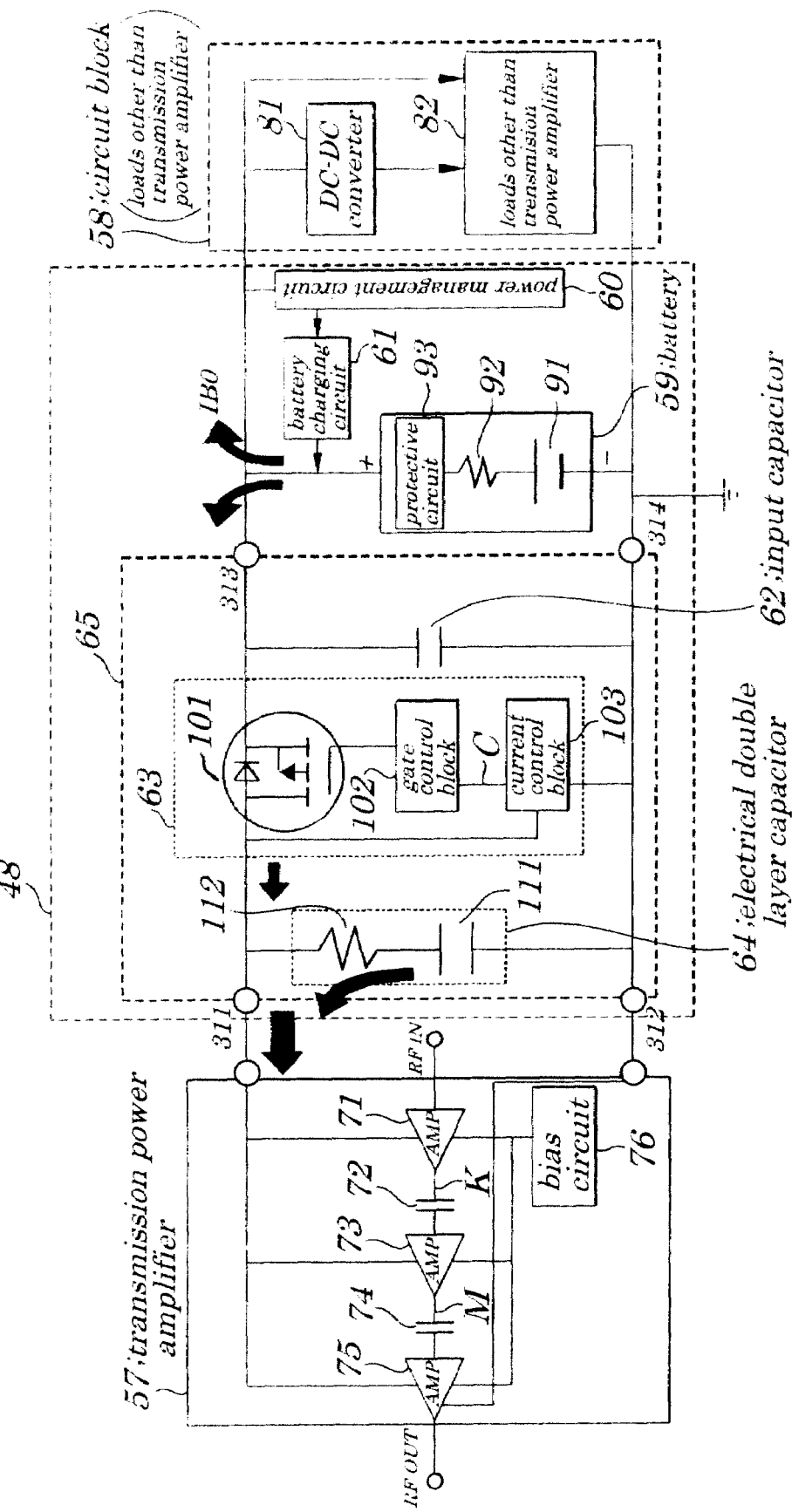
FIG. 3 is a circuit diagram showing electrical configurations of main components of the power circuit, transmission power amplifier, and circuit block shown in FIG. 1.

FIG. 3 is a circuit diagram for showing electrical configurations of main components of the power circuit 48 shown in FIG. 1, the transmission power amplifier 57 shown in FIG. 3, and a circuit block 58. The transmission power amplifier 57, as shown in FIG. 3, includes an amplifier (AMP) 71, a capacitor 72, an amplifier (AMP) 73, a capacitor 74, an amplifier (AMP) 75, and a bias circuit 76. Each of the amplifiers 71, 73, and 75 is made up of a bipolar transistor, MOS transistor, or a like. The bias circuit 76 generates a bias voltage used to normally operate these amplifiers 71, 73, and 75. Each of the transmission power amplifier 57 and the circuit block 58 has a lower limit value of an operating voltage for its normal operations. In the transmission power amplifier 57, a transmission signal RFIN to be employed in the TDMA communication method (for example, GSM method) in which a burst period and a non-burst period occur alternately in a repeated manner or to the TDD communication method is input to the amplifier 71. The transmission signal RFIN is amplified by the amplifier 71 from which an output signal K is output. The output signal K fed from the amplifier 71, after its DC (Direct Current) component has been intercepted by the capacitor 72, is input to the amplifier 73 where it is amplified and is then output as an output signal M from the amplifier 73. The output signal M, after its DC component has been intercepted by the capacitor 74, is input to the amplifier 75 where it is amplified and a radio signal RFOUT as a transmission radio wave is output from the amplifier 75.

The circuit block 58 includes various circuits other than the transmission power amplifier 57 shown in FIG. 2 and is made up of, for example, a DC-DC converter circuit 81 and loads 82 other than the transmission power amplifier 57 and provides a tolerance of an operating voltage having a lowest limit value being higher than that of an operating voltage of the transmission power amplifier 57 and consumes power required for operational processing. The DC-DC converter circuit 81 boosts or lowers an output voltage of the power circuit 48. The loads 82 other than the transmission power amplifier 57 are made up of, for example, power sources for a microcomputer, DSP, SIM card, memory, human interface devices (for example, a voice device, input/output device, image pick-up device or a like) in which the output voltage of the power circuit 48 is directly applied to loads 82 other than the transmission power amplifier 57 that operate at the output voltage of the power circuit 48 and a voltage obtained by boosting or lowering the output voltage of the power circuit 48 using the DC-DC converter circuit 81 is applied to those that do not operate at the output voltage of the power circuit 48 and require conversion of voltages.

The power circuit 48 is made up of a battery 59, a power management circuit 60, a battery charging circuit 61, and a circuit mounting section 65. The circuit mounting section 65 includes a control circuit 63, an input capacitor 62 as a delay device, and an electrical double layer capacitor 64. The battery 59 is, for example, a lithium ion battery and its discharging voltage range is generally from about 4.2V to about 2.5V. The battery 59 includes a single cell 91, an internal resistor 92, and a protective circuit 93 and a resistance of the internal resistor 92 is produced by an electrolyte and a combined resistance including electrode connecting resistance and/or charge movement resistance, or a like. The protective circuit 93 is made up of a transistor, thermistor, or a like and detects occurrence of overcharge, over-discharge, over-current, heating, or a like and insulates the battery 59 from loads.

Figure 17:
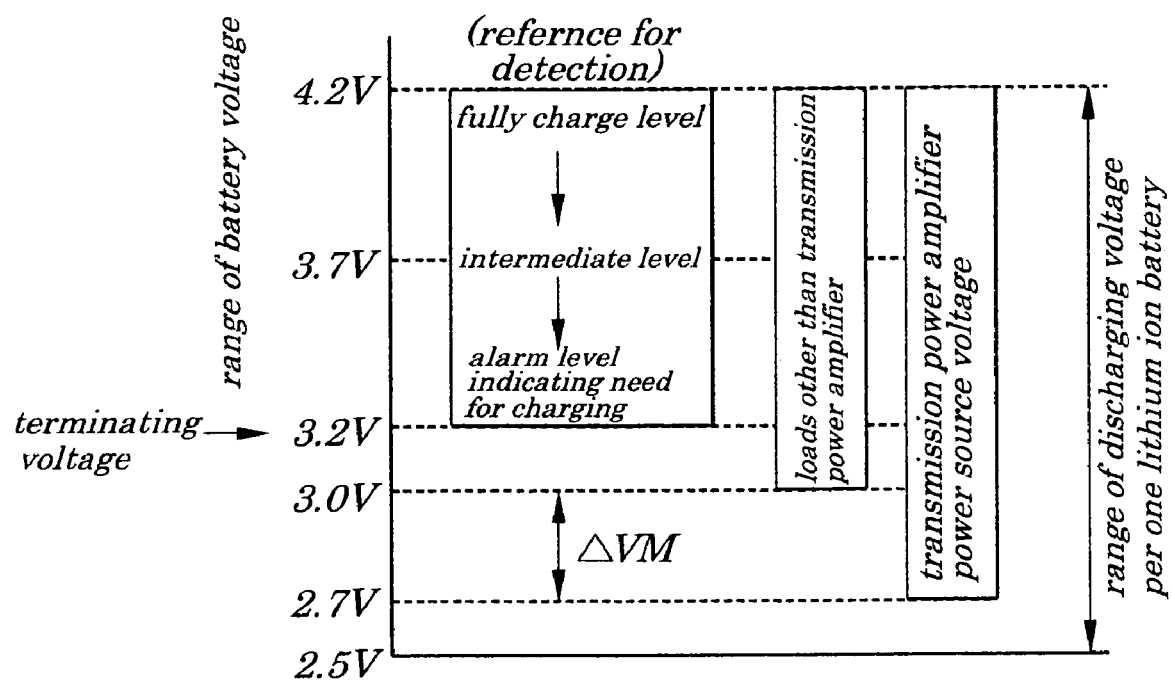
FIG. 17 is a diagram showing a range of a discharging voltage of a battery shown in FIG. 15, reference for detection of a residual capacity of the battery connected to a power management circuit shown in FIG. 15, tolerance of an operating voltage of the transmission power amplifier shown in FIG. 15, and tolerance of an operating voltage of the circuit block shown in FIG. 15.

The power management circuit 60 monitors an output voltage of the battery 59 and detects a residual capacity according to a reference for detection employed in the conventional technology shown in FIG. 17 and, when the residual capacity becomes small and the output voltage becomes a specified level of reference having been set to be more than a lower limit value of an operating voltage of the circuit block 58, a notification informing that the output voltage has dropped is provided by producing a control signal, for example, to display an alarm for charging. As shown in FIG. 17, when the output voltage of the battery 59 is, for example, about 4.2V, a residual capacity is at a full charge level and the battery 59 has a voltage enough to drive the transmission power amplifier 57 and the circuit block 58. Also, when the output voltage of the battery 59 is, for example, about 3.7V, the residual capacity is at an intermediate level and the battery 59 has a voltage enough to drive the transmission power amplifier 57 and the circuit block 58.

Moreover, when the output voltage of the battery 59 is, for example, about 3.2V, the residual capacity is at a level that an alarm indicates a need for charging. At this point, though the battery 59 has a voltage enough to drive the transmission power amplifier 57, since the output voltage of the circuit block 58 has reached a lower limit value (3.0V) of tolerance of the output voltage of the circuit block 58, a state in which an operating voltage is in short supply occurs. The voltage of 3.2V is set as a terminating voltage for the battery 59.

The battery charging circuit 61, by being connected to an outside power source not shown, charges the battery 59 at a specified voltage and at a specified current based on a control signal fed from the power management circuit 60. The input capacitor 62 is charged or discharged when a current to be consumed by the transmission power amplifier 57 rapidly increases (rises up) or decreases (falls down), and delays a rising edge or a falling edge of an output current of the battery 59 occurring at a rise time or a fall time of the burst period.

The control circuit 63 is made up of a p-channel MOSFET (Metal-Oxide-Semiconductor Field Effect Transistor) (hereafter called simply as a "pMOS") 101, a gate control block 102, and a current control block 103. The current control block 103 detects a drain current based on a voltage between a drain and a source of the pMOS 101 and transmits a control signal C to the gate control block 102 so that the drain current becomes a pre-set value. The gate control block 102, based on the control signal C, produces a gate control voltage G used to control a resistance value between the drain and source of the pMOS 101. In the pMOS 101, a resistance between the drain and source is controlled based on the gate control voltage G and a drain current based on the resistance flows.

The control circuit 63 feeds an output current being limited to a pre-set current value from the battery 59 to the transmission power amplifier 57 and, when a voltage of the electrical double layer capacitor 64 becomes below a voltage of the battery 59 during the burst period, charges the electrical double layer capacitor 64 during the subsequent non-burst period until a voltage of the electrical double layer capacitor 64 becomes almost equal to a voltage of the battery 59. Moreover, an output current (drain current of the pMOS 101) of the control circuit 63 is set to be a current value that can supply almost all power being able to be consumed in one frame cycle made up of one burst period and one non-burst period to the transmission power amplifier 57. In the case of the GSM-type portable cellular phone, the one frame cycle is several milliseconds. Furthermore, the control circuit 63, when power to be consumed in the transmission power amplifier 57 during the non-burst period is smaller than power that the control circuit 63 can supply, charges the electrical double layer capacitor 64 that has discharged during the burst period.

The electrical double layer capacitor 64 is made up of, for example, an electrostatic capacitor 111 and an internal resistor 112 and is charged by an output current of the control circuit 63 and accumulates power to feed it to the control circuit 63 and the transmission power amplifier 57. The electrostatic capacitor 111 has capacitance of a few tens of mF or more and the internal resistor 112 has resistance of 500 mΩ or less. Also, the electrical double layer capacitor 64, when power to be consumed by the transmission power amplifier 57 during the burst period is larger than power that can be supplied by the control circuit 63, feeds power for replenishing by discharging.

The circuit mounting section 65 includes the input capacitor 62, control circuit 63, and electrical double layer capacitor 64, in which a power source terminal 313 and a ground terminal 314 are mounted on an input side and a power source terminal 311 and a ground terminal 312 are mounted on an output side.

Figure 4:
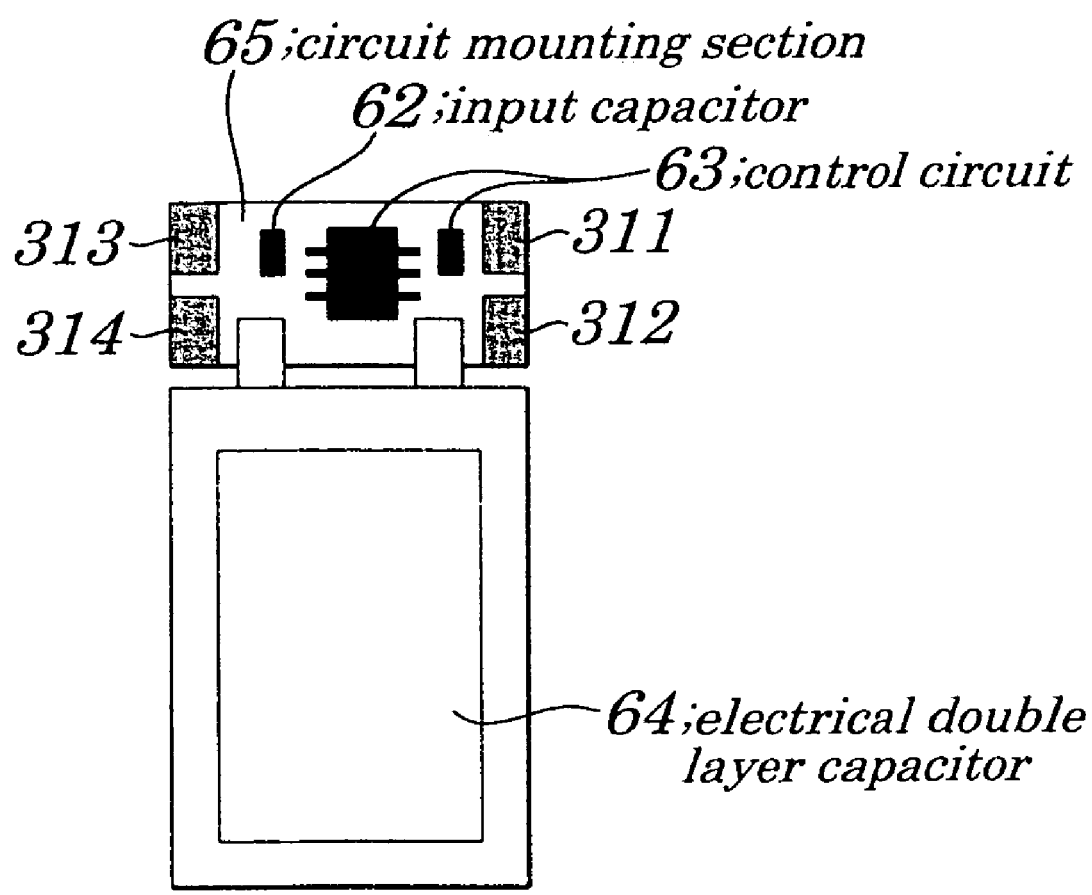
FIG. 4 is a diagram showing configurations of a circuit mounting section 65 shown in FIG. 3.

FIG. 4 is a diagram showing configurations of a circuit mounting section 65 shown in FIG. 3. The circuit mounting section 65, as shown in FIG. 4, is made of a flexible printed circuit board (FPC board) for example in which the input capacitor 62 constructed so as to be of surface mounting type and the control circuit 63 are mounted and, since the electrical double layer capacitor 64 is mounted to one terminal of the circuit mounting section 65, its thickness is 2 mm or less and a product of a length and a width is about 200 mm$^2$. Moreover, to one terminal of the circuit mounting section 65 are mounted the power source terminal 313 and the ground terminal 314 and to another terminal of the circuit mounting section 65 are mounted the power source terminal 311 and the ground terminal 312.

Figure 5:
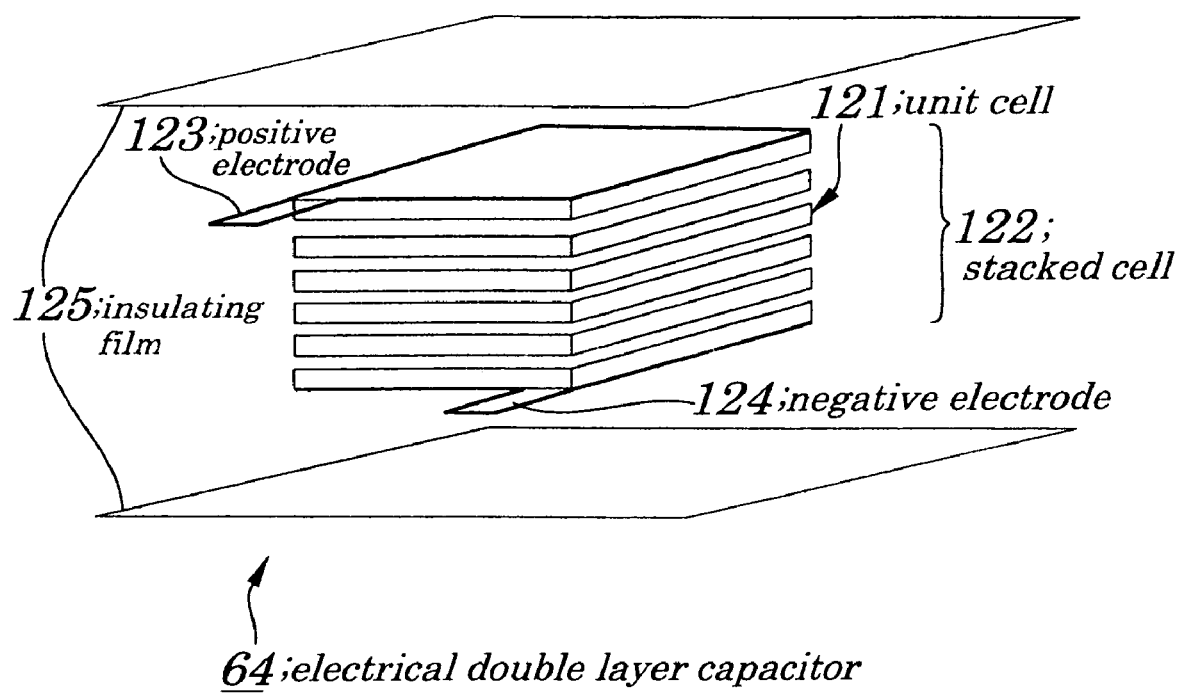
FIG. 5 is a diagram showing configurations of an electrical double layer capacitor shown in FIG. 4.

FIG. 5 is a diagram showing configurations of the electrical double layer capacitor 64 shown in FIG. 4. The electrical double layer capacitor 64, as shown in FIG. 5, includes six pieces of unit cells 121 having a structure of double-layers made of thin sheets in which these units cells 121 are stacked in layer which make up a stacked cell 122 that can provide a withstand voltage and electrostatic capacity required as a power source for the transmission power amplifier 57. Also, at an end portion of the unit cell 121 placed on an uppermost portion is mounted a positive electrode 123 and at an end of the unit cell 121 placed on a lowermost portion is mounted a negative electrode 124. The stacked cell 122 is sandwiched between the insulating films 125 in a manner that the positive electrode 123 and the negative electrode 124 are exposed.

Figure 6:
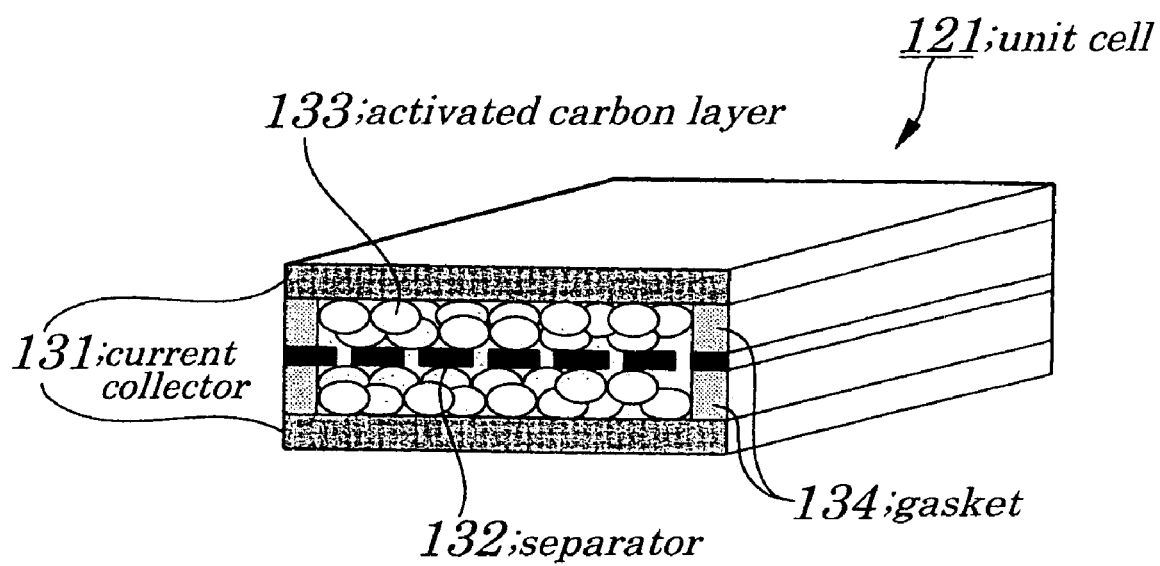
FIG. 6 is a diagram showing configurations of a unit cell shown in FIG. 5.

FIG. 6 is a diagram showing configurations of the unit cell 121 shown in FIG. 5. The unit cell 121, as shown in FIG. 6, is made up of a current collector 131, a separator 132, an activated carbon layer 133, and a gasket 134. The current collector 131 serves as a positive pole or a negative pole and the separator 132 separates the positive pole from the negative pole. The activated carbon layer 133 accumulates a charge and is held by the gasket 134. By forming a layer-like unit cell 121, a capacitor is constructed based on a principle of a thin-sheet-shaped electrical double layer. The electrical double layer capacitor 64 has an electrostatic capacity being larger than that of a ceramic capacitor, aluminum electrolytic capacitor, tantalum electrolytic capacitor, or a like, and its electrostatic capacitor has for example a product of a length and a width being about 1000 mm$^2$, a thickness being about 2 mm, capacity of 30 mF or more (withstand voltage: for example, 5V). On the other hand, an effective dimension of a clearance between an outer case and a component mounting portion in presently-available portable cellular phones is 2 mm or so in height and about 1500 mm$^2$ in area and, since a clearance that can be formed by the circuit mounting section 65 and electrical double layer capacitor 64 of the embodiment can fall within the above effective dimension employed in the presently-available portable cellular phones, mounting of a power circuit in the portable cellular phone can be achieved, without impairing portability of portable cellular phones, by using the circuit mounting section 65 and electrical double layer capacitor 64 of the embodiment of the present invention.

Figure 7:
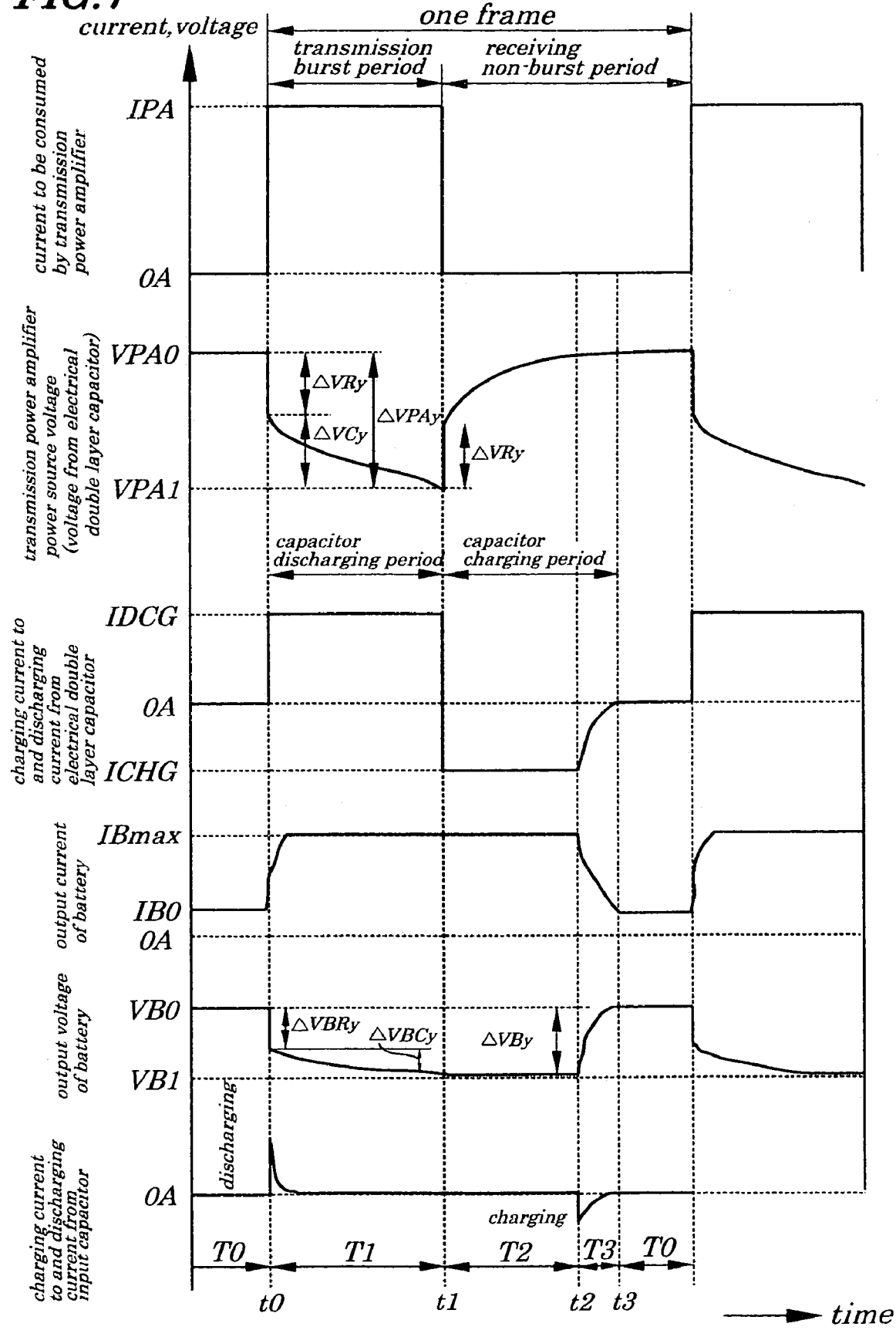
FIG. 7 is a time chart explaining operations of the power circuit and the transmission power amplifier shown in FIG. 3.
Figure 8:
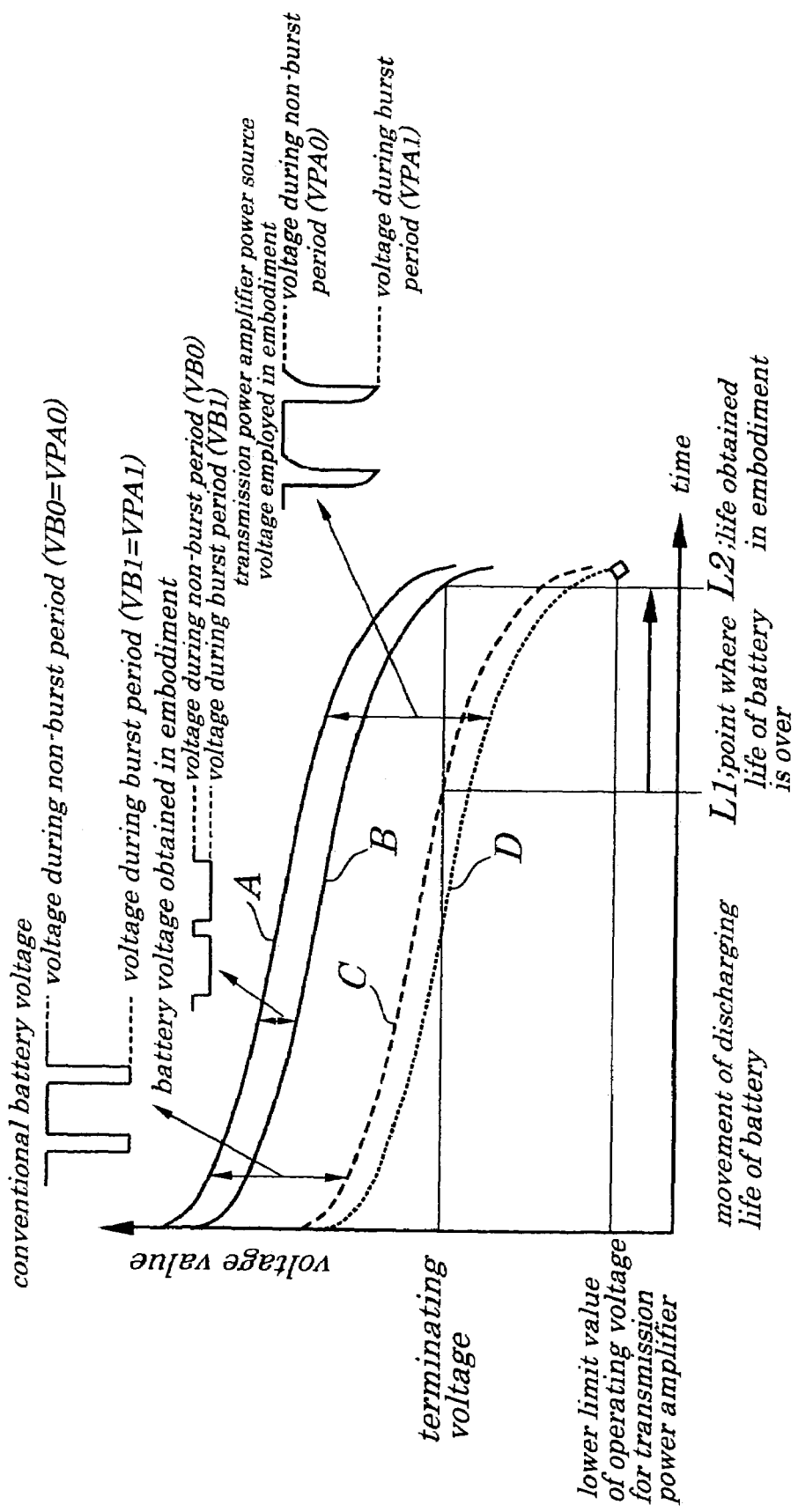
FIG. 8 is a diagram explaining an effect of lengthening a life of a battery according to the first embodiment of the present invention.
Figure 9:
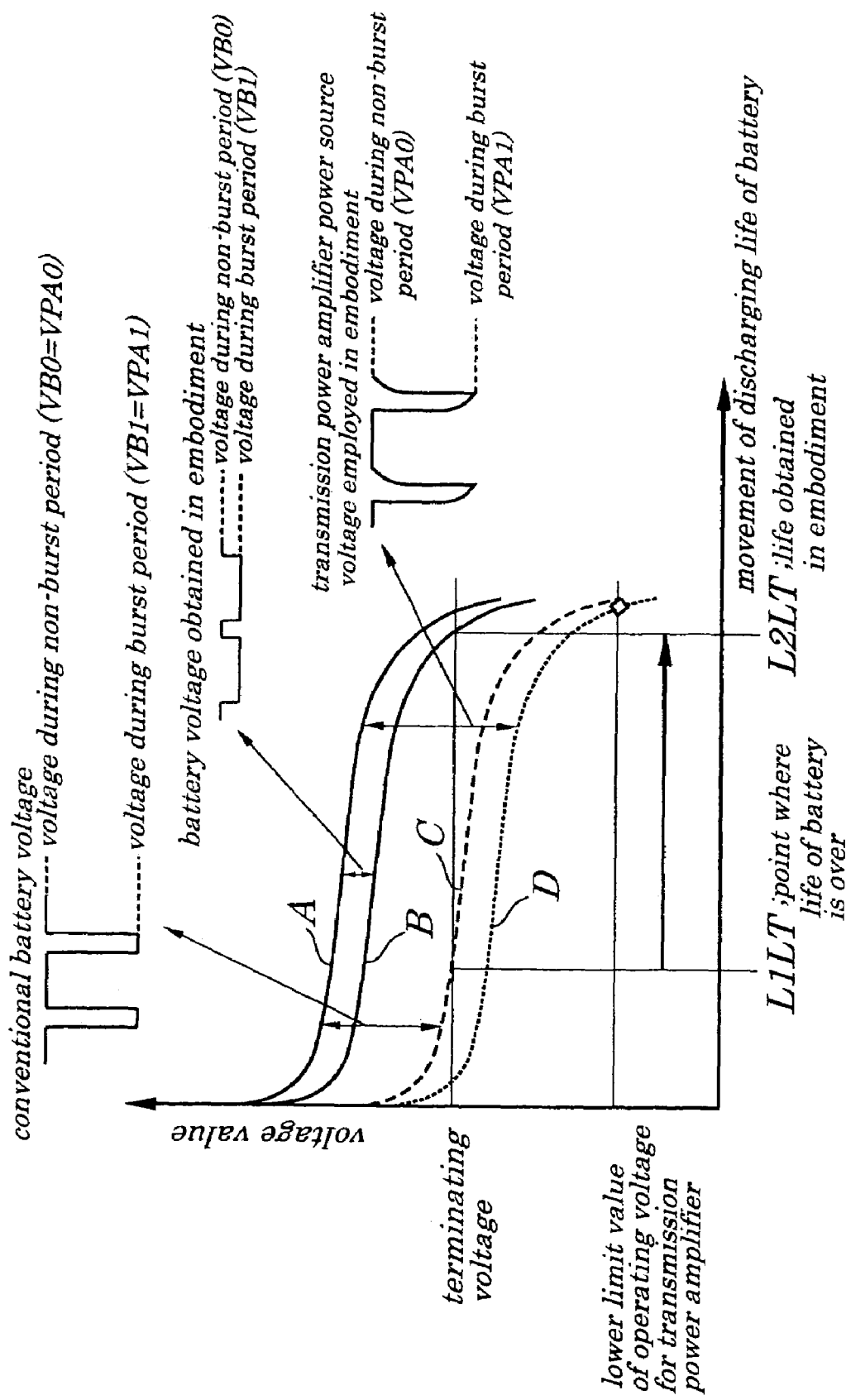
FIG. 9 is also a diagram explaining the effect of lengthening the life of the battery according to the first embodiment of the present invention.

FIG. 7 is a time chart explaining operations of the power circuit 48 and the transmission power amplifier 57 shown in FIG. 3. FIG. 8 is a diagram explaining an effect of lengthening a life of the battery 59 according to the first embodiment of the present invention. FIG. 9 is also a diagram explaining the effect of lengthening the life of the battery 59 according to the first embodiment of the present invention. Operations of the portable cellular phone of the first embodiment are described by referring to FIGS. 7, 8, and 9.

First, at the time t0, when a transmission burst period begins by a start of transmitting operations, a current consumed by the transmission power amplifier 57 rapidly increases from 0A to a current value IPA. A discharging current IDCG is fed from the electrical double layer capacitor 64 to the transmission power amplifier 57. A current output from the battery 59 increases, in synchronization with starting of the transmission burst period, up to a current value IBmax being an upper limit value set by the control circuit 63, however, there is a delay in the increase of the output current of the battery 59 by an action of absorbing a surge caused by discharging of the input capacitor 62. This serves to suppress a fluctuation of the output voltage of the battery 59 due to the start of the transmission burst period. Then, the current with the value IDCG of the electrical double layer capacitor 64 is combined with the current with the value IBmax of the battery 59 and the combined current is fed as a current value IPA to the transmission power amplifier 57. A voltage being applied from the electrical double layer capacitor 64 to the transmission power amplifier 57 drops by a voltage value ΔVRy from a voltage value VPA0 induced by a voltage drop determined by resistance of the internal resistor 112 and an amount of a discharged current of the electrical double layer capacitor 64, in synchronization with starting of the transmission burst period. An output voltage of the battery 59 drops due to existence of a resistance component in series between the internal resistor 92 and the protective circuit 93 and lowers from a voltage value VB0 by a voltage value ΔVBRy.

During a period T1, that is, during the transmission burst period, since the transmission power amplifier 57 is continuing transmission operations, a consumed current remains constant at a level of the current value IPA. A discharging current (current with a value of IDCG) fed from the electrical double layer capacitor 64 is continuously fed to the transmission power amplifier 57. The output current of the battery 59, after the delay caused by the input capacitor 62 has disappeared, remains at a level of the current value IBmax set by the control circuit 63. A current (IPA=IBmax+IDCG) obtained by combining a discharged current (current value IDCG) fed from the electrical double layer capacitor 64 with a discharged current (current with the value of IBmax) of the battery 59 is continuously fed as a current with the value of IPA to the transmission power amplifier 57. A voltage being applied to the transmission power amplifier 57 from the electrical double layer capacitor 64 is lowered by a voltage value ΔVCy due to a voltage drop caused by discharging of the electrical double layer capacitor 64. Therefore, a voltage being applied to the transmission power amplifier 57 at a terminating time of a period T1, since a decrease of a voltage with a value of ΔVRy occurring at the time t0 is added to a decrease of a voltage with the value ΔVCy, lowers by a voltage value ΔVPAy (=ΔVRy+ΔVCy) and therefore changes from a voltage value VPA0 to a voltage value VPA1. The output voltage of the battery 59, due to a voltage drop corresponding to an electrostatic capacity component of the battery 59 induced by an output current with the value of IBmax, lowers by a voltage value obtained by adding a voltage value ΔVBCy to a decrease ΔVBRy of a voltage value at the time t0.

At the time t1, when the transmission burst period ends after termination of the transmitting operation, a current consumed by the transmission power amplifier 57 rapidly lowers from the current value IPA to almost 0A. In the electrical double layer capacitor 64, a discharging state is switched to a state in which charging begins at a current having a current value ICHG. At this point, an output current of the battery 59 remains at a level of the current value IBmax having been set by the control circuit 63 and the electrical double layer capacitor 64 is charged at a current with the value of ICHG and a current with the value of IB0 is supplied to the circuit block 58. In this case, a following relational equation holds:

$IBmax=ICHG+IB0$.

A voltage being applied from the electrical double layer capacitor 64 to the transmission power amplifier 57 is boosted by a voltage value ΔVRy from a voltage with a value of VPA1 in synchronization with ending (falling edge) of the transmission burst period in response to an increase in voltage determined by a resistance of the internal resistor 112 in the electrical double layer capacitor 64 and by an amount of a charged current of the electrical double layer capacitor 64. Due to a voltage drop being equivalent to a voltage value ΔVBRy occurring at the time t0 and due to an additional voltage drop corresponding to an electrostatic capacity component of the battery 59 induced by an output current with the value of IBmax, the output voltage of the battery 59 has further lowered.

During the period T2, that is, during the receiving non-burst period, since the radio wave receiving section of the portable cellular phone is continuing signal receiving operations and the transmission power amplifier 57 does not operate, currents consumed by the transmission power amplifier 57 are almost 0A. The electrical double layer capacitor 64 is still in a state where it is being charged at a current with the value ICHG. The output current of the battery 59 remains at a level of the current value IBmax. The voltage to be fed from the electrical double layer capacitor 64 to the transmission power amplifier 57 is boosted exponentially since it is charged at a current with the value ICHG. The output voltage of the battery 59 lowers by a voltage value ΔVBCy due to a voltage drop corresponding to an electrostatic capacity component of the battery 59 induced by an output current with the value IBmax. Therefore, an output voltage of the battery 59 occurring at the end time of the period T2 lowers, due to a voltage drop of ΔVBCy in addition to a voltage drop of ΔVBRy occurring at the time t0, by a voltage value ΔVBy (=ΔVBRy+ΔVBCy) and from a voltage value VB0 to a voltage value VB1.

At the time t2, that is, during the receiving non-burst period, since the receiver 43 is continuing radio wave receiving operations and the transmission power amplifier 57 does not operate, currents consumed by the transmission power amplifier 57 are almost 0A. In the electrical double layer capacitor 64, a charging current begins to decrease from a level of the current value ICHG. The output current of the battery 59 begins to decrease from a level of the current value IBmax in synchronization with decreasing of the charging current of the electrical double layer capacitor 64. At this point, there is a delay in the decrease (falling time) of the output current of the battery 59 caused by an action of absorbing a surge induced by charging of the input capacitor 62. A voltage being applied from the electrical double layer capacitor 64 to the transmission power amplifier 57 is gradually boosted since the electrical double layer capacitor 64 is charged at a current being smaller than the current value ICHG. The output voltage of the battery 59 is gradually boosted since the output current of the battery 59 is limited due to existence of a resistance component by serial connection between the internal resistor 92 and the protective circuit 93.

During the period T3, that is, during the receiving non-burst period, since the receiver 43 is continuing radio wave receiving operations and the transmission power amplifier 57 does not operate, currents consumed by the transmission power amplifier 57 are almost 0A. The voltage of the electrical double layer capacitor 64 is approaching the output voltage of the battery 59 and charging is being completed. This causes the charging current to come near 0A. The output current of the battery 59 decreases, in synchronization with lowering of the charging current of the electrostatic double layer capacitor 64, from a level of the current value IBmax and comes near to the load current (current with the value of IB0) of the circuit block 58. A voltage being applied from the electrical double layer capacitor 64 to the transmission power amplifier 57, since the electrical double layer capacitor 64 is charged, gradually comes near to an output voltage of the battery 59. The output voltage of the battery 59, as its output current decreases, is boosted exponentially based on a time constant of an electrostatic capacity and a resistance component of the battery 59.

At the time t3, that is, during the receiving non-burst period, since the radio wave receiving section is continuing radio wave receiving operations and the transmission power amplifier 57 does not operate, currents consumed by the transmission power amplifier 57 are almost 0A. In the electrical double layer capacitor 64, the charging has been completed and a charging current has become 0A. The battery 59, since charging of the electrical double layer 64 has been completed, feeds a current with the value of IB0 to the circuit block 58. A voltage being applied from the electrical double layer capacitor 64 to the transmission power amplifier 57, since charging of the electrical double layer capacitor 64 has been completed, becomes almost equal to an output voltage of the battery 59. The output voltage of the battery 59 becomes commensurate in voltage with a current with the value of IB0 to be fed to the circuit block 58.

During the period T0, that is, during the receiving non-burst period, since the radio wave receiving section is continuing radio wave receiving operations and the transmission power amplifier 57 does not operate, currents consumed by the transmission power amplifier 57 are almost 0A. In the electrical double layer capacitor 64, charging has been completed and its charging current still remains 0A. The output voltage of the battery 59, since charging of the electrical double layer capacitor 64 has been completed, remains at a level of a current with the value of IB0 to be fed to the circuit block 58. The voltage being applied from the electrical double layer capacitor 64 to the transmission power amplifier 57, since charging of the electrical double layer capacitor 64 has been completed, remains almost equal to the output voltage of the battery 59. The output voltage of the battery 59 remains commensurate in voltage with a current with the value of IB0 to be fed to the circuit block 58. Then, these voltages and currents are again put into the state that has occurred at the time t0 and, thereafter, same operations are repeated in order of the time t0, period T1, time t1, period T2, time t2, period T3, time t3, period T0, time t0, . . . .

In the portable cellular phone of the embodiment, a life of the battery 59 is judged based on a lowest voltage value VB1 occurring during the transmission burst period. A simulation value of the voltage value ΔVBy used to obtain the above voltage value VB1, if the following simulation conditions are used, becomes about 90 mV being one third or less of a conventional value of 300 mV.

Simulation conditions;

Resistance of the internal resistor 92; 150 mΩ

Transmission burst period; 0.5 msec

Receiving non-burst period; 4.5 msec

Output current of the battery 59;

Ibmax; 0.7 A.

IB0; 0.1 A.

Discharging current of electrical double layer capacitor 64;

IDCG=1.4A

ΔVBRy=0.15·(0.7−0.1)=0.09V

ΔVBCy=(0.0005·0.7)/electrostatic capacity of the battery 59>0

ΔVBy=ΔVBRy+ΔVBCy>9 mV

∴ΔVBy<<ΔVBx

That is, in the portable cellular phone of the embodiment, the output of the battery 59 does not become 3.2V or less (terminating voltage) during the transmission burst period until it becomes 3.3V during the receiving non-burst period, the battery 59 is usable until its output voltage becomes lower than that in the conventional case and its life can be lengthened.

Figure 16:
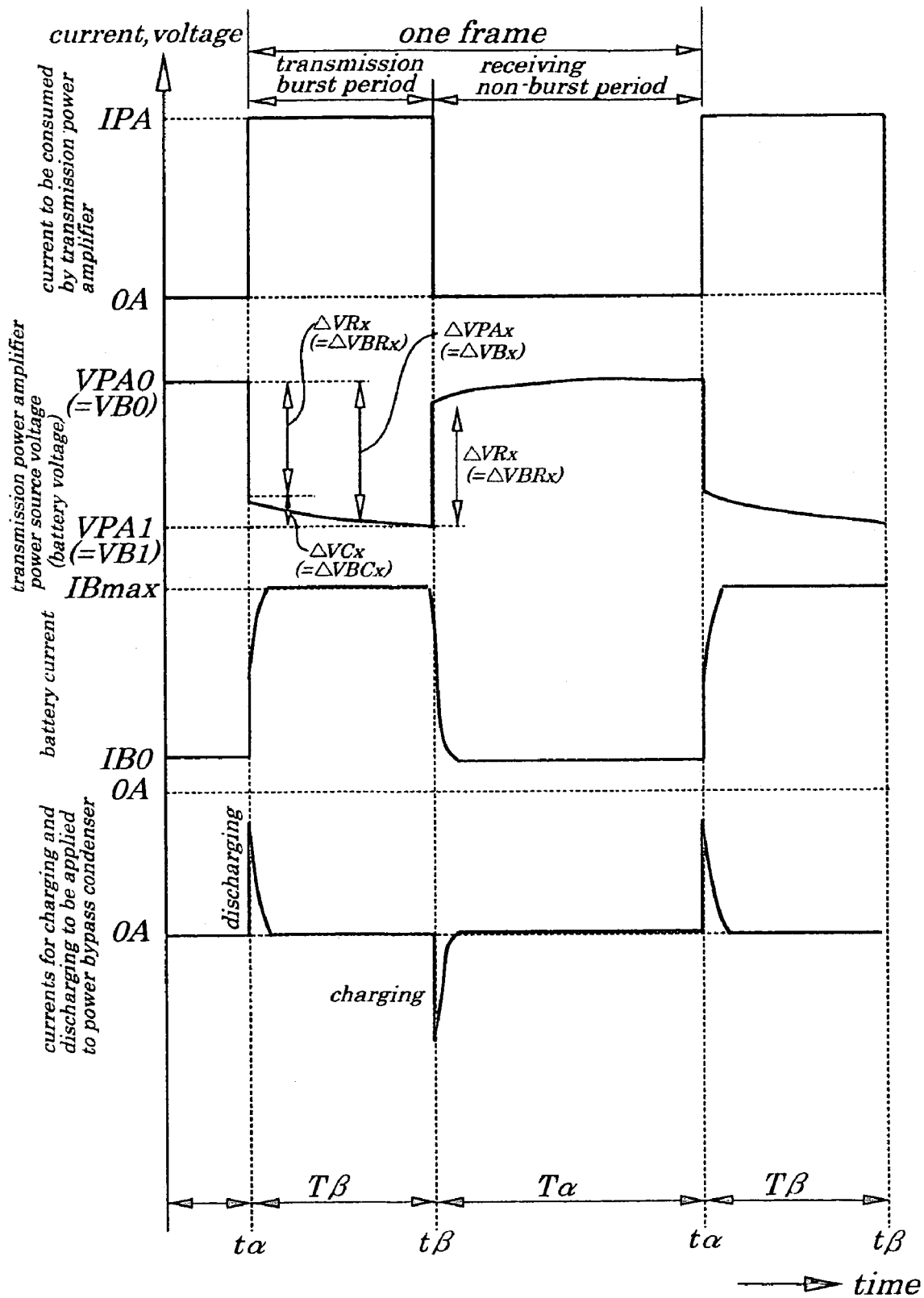
FIG. 16 is a time chart explaining operations of the conventional portable cellular phone of FIG. 15.

Next, a life of the battery 59 being put at ambient temperature being at room temperature of about 20° C. is described by referring to FIG. 8. In FIG. 8, a curve "A" shows movement of the voltage value VB0 (=VPA0) of the battery 31 occurring at the time tα employed in the conventional case shown in FIG. 16 and movement of the voltage value VB0 of the battery 59 occurring at the time t0 shown in FIG. 7. The curve "B" shows movement of the voltage value VB1 of the battery 59 occurring at the time t2 shown in FIG. 7. The broken-line curve C shows movement of the voltage value VB1 (=VPA1) of the battery 31 occurring at the time tα shown in FIG. 16. The dotted-line curve D shows movement of an operating voltage VPA1 of the transmission power amplifier 57 occurring at the time t1 shown in FIG. 7.

In the conventional case, the output voltage of the battery 31 occurring during the transmission burst period moves as shown by the broken-line curve C and, at the time L1, the life of the battery 31 is judged to have been over. In the embodiment, the output voltage of the battery 59 occurring during the transmission burst period moves as shown in the curve B and, at the time of L2, the life of the battery 59 is judged to have been over and the life of the battery 59 being longer than that of the battery 31 can be provided. Moreover, by properly setting the current value IBmax, resistance of the internal resistor 112 of the electrical double layer capacitor 64, and electrostatic capacity of the electrostatic capacitor 111, a time point at which an operating voltage VPA1 reaches a lower limit value of the operating voltage of the transmission power amplifier 57 comes after the time L2, as shown in the dotted-line curve D. This makes it possible to provide the power circuit for the transmission power amplifier being well matched in terms of outer size and manufacturing cost.

Next, a life of the battery 59 being put at ambient temperature being below 0° C. is described by referring to FIG. 9. Generally, in the case of a battery operating by an electrochemical reaction, its internal resistance increases with a decrease of ambient temperatures. Therefore, an output voltage of the battery is lowered with an increase in internal resistance. On the other hand, a terminating voltage of a battery 31 being set in the power management circuit 60, as shown in FIG. 9, is set to be constant irrespective of ambient temperatures and, therefore, in a low-temperature environment, a life of the battery 31 is remarkably shortened. Conventionally, an output voltage of the battery 31 being put in a low-temperature occurring during the transmission burst period moves as shown in the broken-line curve C and, at the time L1LT, the life of the battery 31 is judged to have been over and is remarkably shortened compared with a case where the battery is put at room temperature. In the embodiment of the present invention, however, an output voltage of the battery 59 occurring during the transmission burst period, as shown by the curve B, since a voltage drop is small during the transmission burst period, at the time L2LT, the life of the battery 59 is judged to have been over and the life is not shortened extremely unlike in the case of the battery 31.

Thus, in the first embodiment, since a output current having been limited to become a current value set in advance is supplied from the battery 59 to the transmission power amplifier 57 and the electrical double layer capacitor 64 is charged and power is accumulated under control of the control circuit 63 and, since power is fed from the electrical double layer capacitor 64 to the control circuit 63 and the transmission power amplifier 57, even if power consumed by the transmission power amplifier 57 increases during the burst period, a drop in the output voltage of the battery 59 is small. As a result, time required for the output voltage to reach a terminating voltage of the battery 59 is made longer and a life of the battery 59 is lengthened. Moreover, even if the battery 59 is put under a low-temperature environment and its internal resistance increases, shortening of the life of the battery 59 can be avoided. Furthermore, since the electrical double layer capacitor 64 is so constructed as to have thin-sheet shaped unit cells 121 and so that these unit cells 121 are stacked in layer, it can be mounted on a folding-type portable cellular phone without causing an increase in thickness.

Second Embodiment

Figure 10:
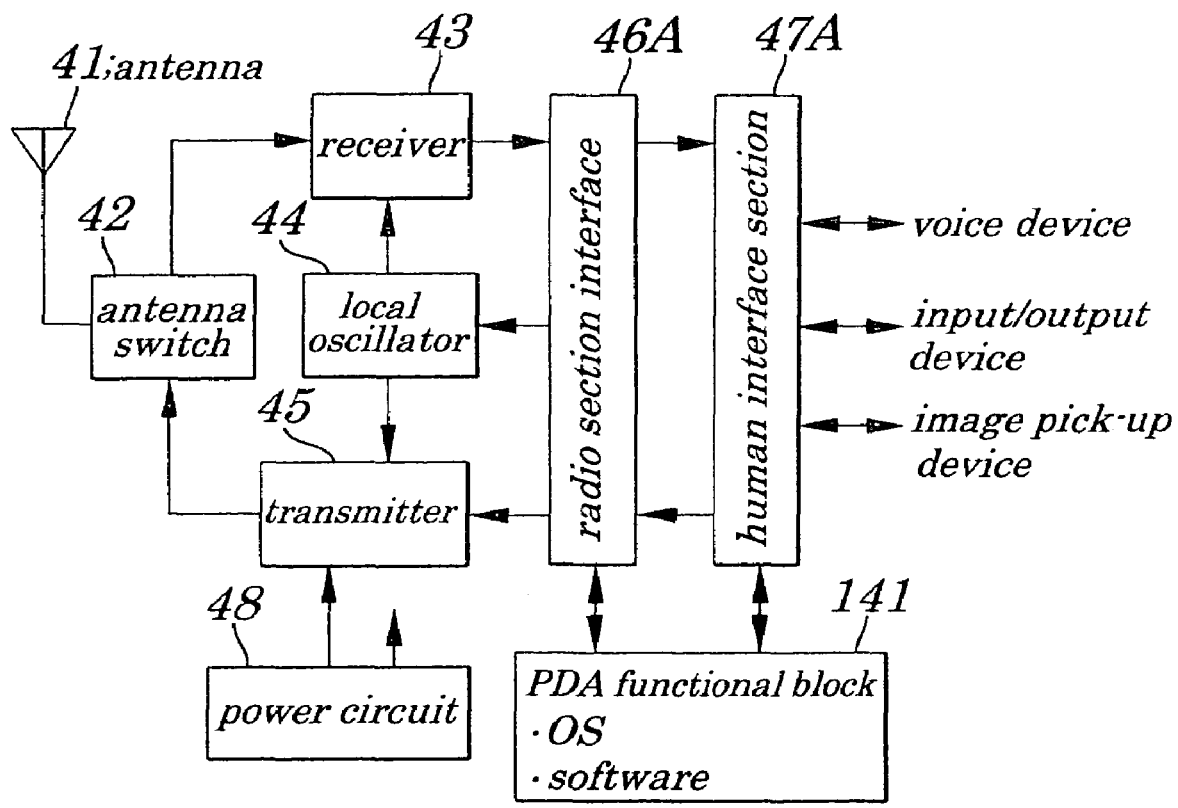
FIG. 10 is a schematic block diagram showing electrical configurations of a portable cellular phone according to a second embodiment of the present invention.

FIG. 10 is a schematic block diagram showing electrical configurations of a portable cellular phone according to a second embodiment of the present invention. In FIG. 10, same reference numbers are assigned to corresponding parts having same functions as the first embodiment shown in FIG. 1. The portable cellular phone of the embodiment has, instead of a radio section interface 46 and a human interface section 47 employed in the first embodiment shown in FIG. 1, a radio section interface 46A and human interface section 47A to each of which new functions are added and further newly includes a PDA (Personal Digital Assistance) functional block 141. In the PDA functional block 141, an operating system (OS) is mounted and software is installed. Each of the radio section interface 46A and human interface section 47A, in addition of the functions of the radio section interface 46 and the human interface section 47A employed in the first embodiment, has a function of swapping specified data with the PDA functional block 141. Other components shown in FIG. 10 have the same functions as the first embodiment shown in FIG. 1.

The portable cellular phone of the second embodiment performs, in addition to operations performed by the portable cellular phone of the first embodiment, operations of, for example, scheduling management and computation.

Third Embodiment

Figure 11:
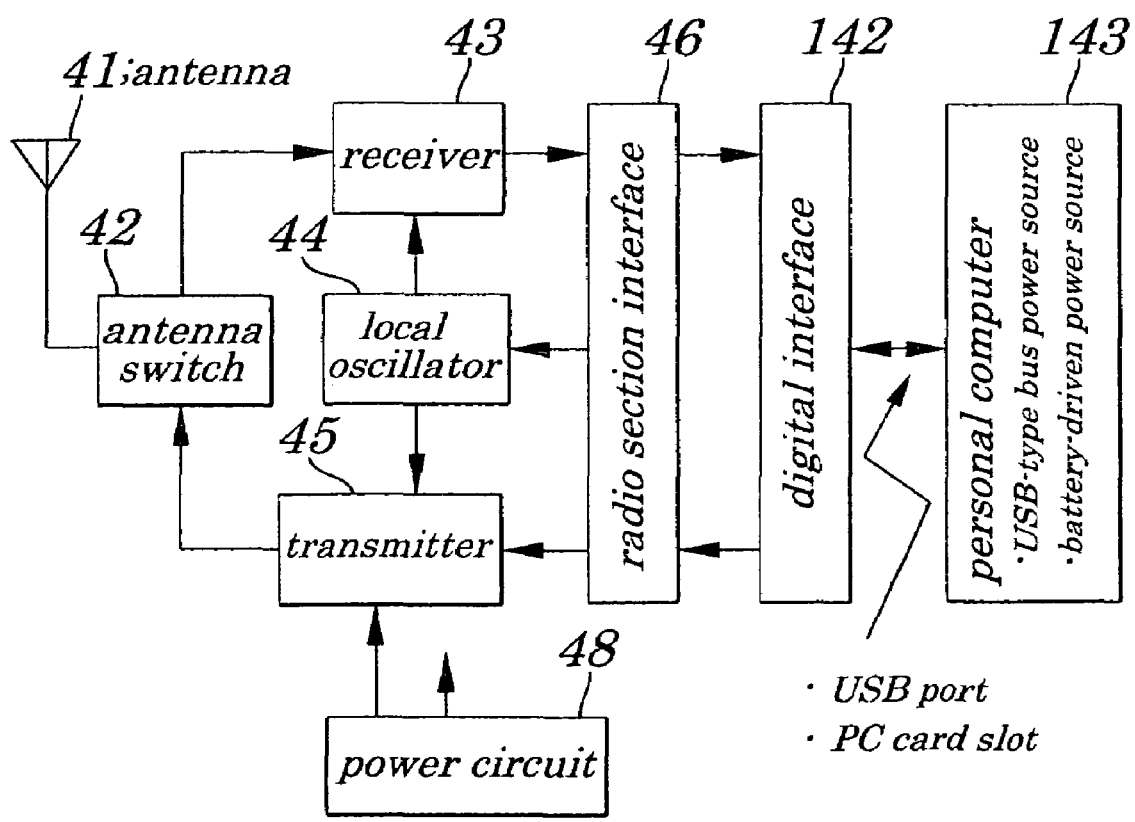
FIG. 11 is a schematic block diagram showing electrical configurations of a portable cellular phone according to a third embodiment of the present invention.

FIG. 11 is a schematic block diagram showing electrical configurations of a portable cellular phone according to a third embodiment of the present invention. The portable cellular phone of the third embodiment has, instead of a human interface 47 shown in FIG. 1, a digital interface 142. The digital interface 142 is connected through, for example, a USB (Universal Serial Bus) port or a PC (Personal Computer) card slot to a personal computer 143. The PC card slot adheres to the PCMCIA (Personal Computer Memorycard International Association).

In the portable cellular phone of the third embodiment, in ordinary cases, power is supplied from the personal computer 143 and, if the personal computer 143 is, for example, a battery-driven notebook PC, by using a power circuit 48, communications time according to the TDMA-system can be extended. Moreover, when a power source such as a USB-type bus power source in which a limitation is imposed on an output current is employed as a power source for a transmitter 45, in some cases, a power source current exceeds the limited power source current during a transmission burst period at the time of communications which impairs normal communications. In this case, by using the power circuit 48 of the invention, an amount of the power source current during the transmission burst period is reduced, thus enabling smooth communications.

Fourth Embodiment

Figure 12:
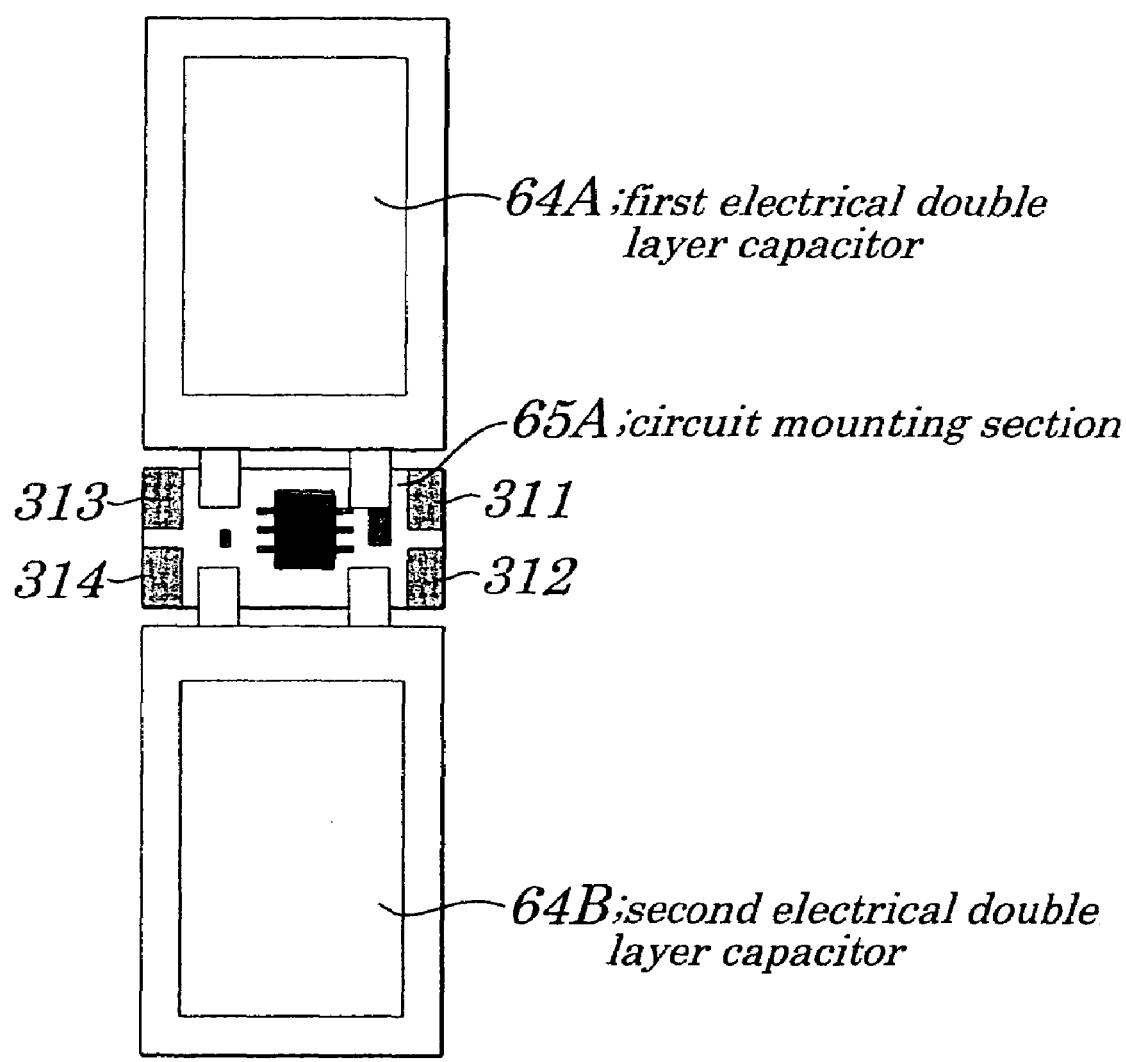
FIG. 12 is a diagram illustrating configurations of a circuit mounting section in a power circuit according to a fourth embodiment of the present invention.

FIG. 12 is a diagram illustrating configurations of a circuit mounting section 65A of a power circuit according to a fourth embodiment of the present invention. In FIG. 12, same reference numbers are assigned to corresponding parts having same functions as the first embodiment shown in FIG. 1. The circuit mounting section 65A is placed instead of the circuit mounting section 65 shown in FIG. 3 and has electrical double layer capacitors 64A and 64B on its both sides. To obtain specified electrical characteristics, these electrical double layer capacitors 64A and 64B are connected to each other serially or in parallel.

Fifth Embodiment

Figure 13:
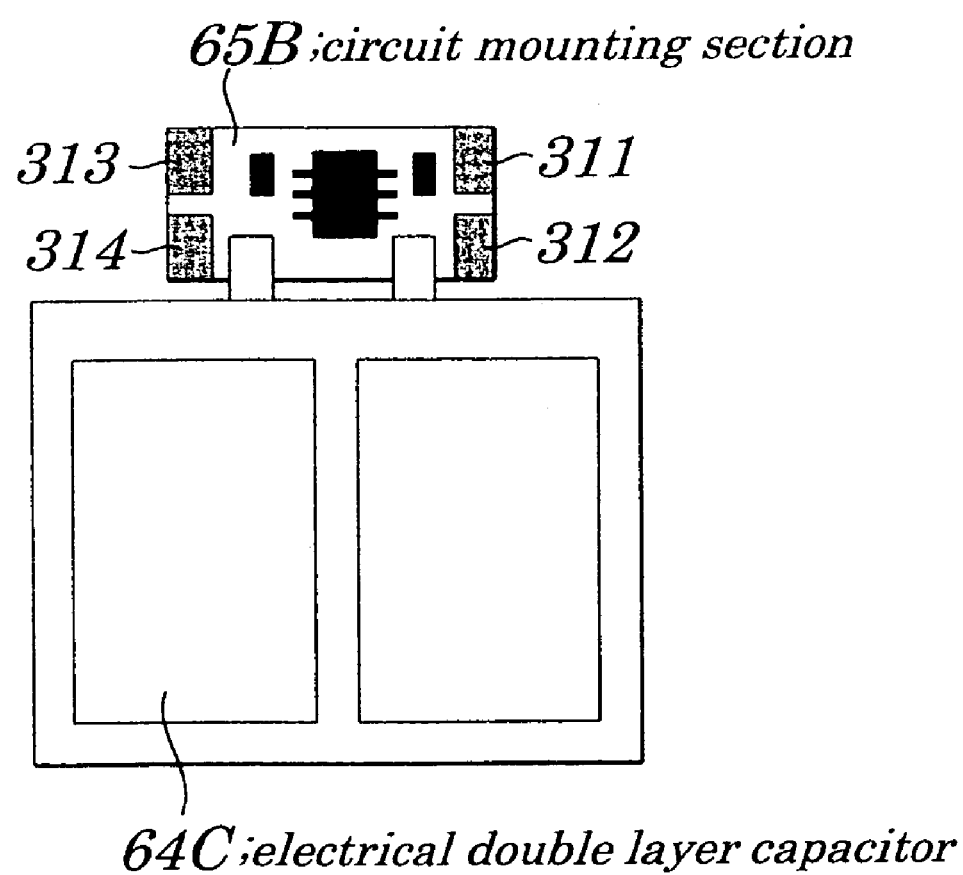
FIG. 13 is a diagram illustrating configurations of a circuit mounting section in a power circuit according to a fifth embodiment of the present invention.

FIG. 13 is a diagram illustrating configurations of a circuit mounting section 65B in a power circuit according to a fifth embodiment of the present invention. In the circuit mounting section 65B of the fifth embodiment, as in the case of a circuit mounting section 65 shown in FIG. 4, an electrical double layer capacitor 64C is mounted on one end of the circuit mounting section 65B.

Figure 14:
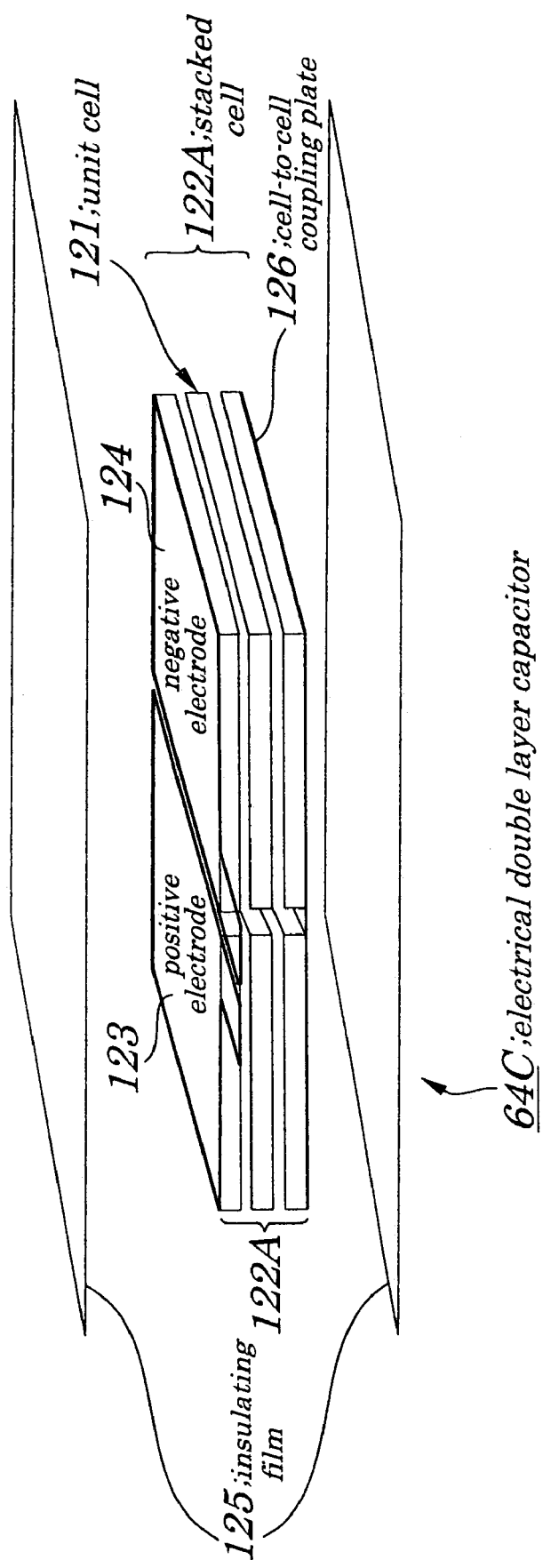
FIG. 14 is a diagram illustrating configurations of the electrical double layer capacitor of FIG. 13.
Figure 15:
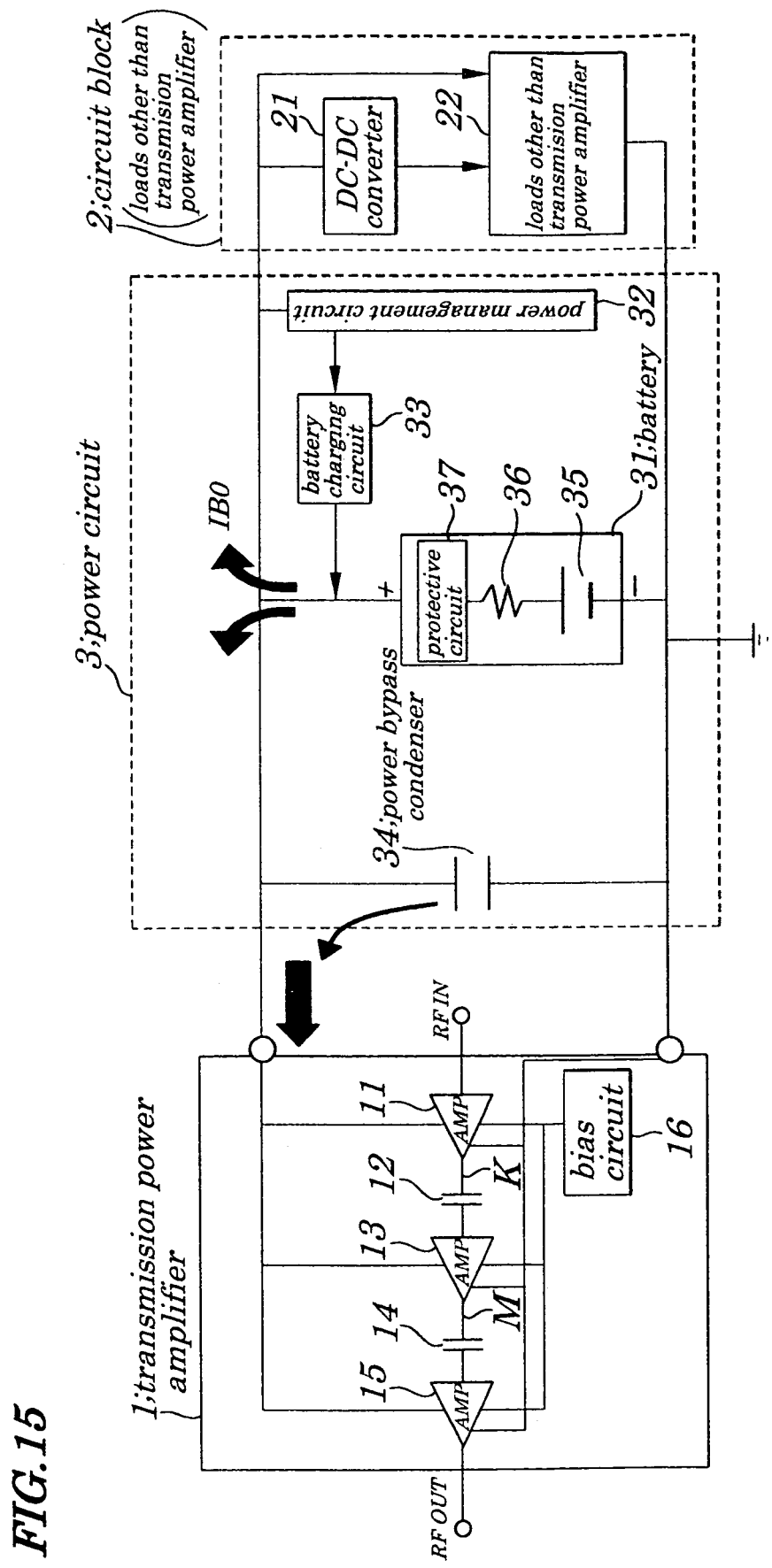
FIG. 15 is a schematic block diagram showing configurations of a conventional portable cellular phone.

FIG. 14 is a diagram illustrating configurations of the electrical double layer capacitor 64C of FIG. 13. In FIG. 14, same reference numbers are assigned to corresponding parts having same functions as the first embodiment shown in FIG. 5. The electrical double layer capacitor 64C, as shown in FIG. 14, includes, for example, three pieces of unit cells 121 in which these units cells 121 are stacked in layer which make up stacked cells 122A. The stacked cells 122A are placed on a cell-to-cell coupling plate 126 for connection among them. By configuring as above, the electrical double layer capacitor 64C can be made thinner than an electrical double layer capacitor 64 shown in FIG. 5.

It is apparent that the present invention is not limited to the above embodiments but may be changed and modified without departing from the scope and spirit of the invention. For example, if a primary cell is used as the battery 59 in the configurations shown in FIG. 3, the battery charging circuit 60 is removed. Also, the circuit block 58 in FIG. 3 may be any type of the circuit block so long as it can perform specified operations with specified power consumption. Moreover, in the above embodiments, examples in which the present invention is applied to portable cellular phones are described, however, the present invention may be applied to portable communication device of all types such as a transceiver or a like.

What is claimed is:

1. A power circuit to supply power a transmission power amplifier of a communication device to amplify a transmission signal having a burst period and a non-burst period occurring alternately in a repeated manner, said power circuit comprising:

a power supplying unit to supply a first power to said transmission power amplifier, and a power storing section to accumulate said first power during said non-burst period as an accumulated second power, and to feed the accumulated second power to said transmission power amplifier in addition to said first power being supplied from said power supplying unit as said power to said transmission power amplifier during said burst period, wherein said power storing section is configured to be charged, when a voltage of said power storing section becomes lower than a voltage of said power supplying unit during said burst period, until a voltage of said power storing section becomes almost equal to a voltage of said cower supplying unit during said non-burst period occurring subsequent to said burst period.

2. The power circuit according to claim 1, further comprising:

a control circuit to control said first power to be fed from said power supplying unit to said transmission power amplifier, wherein said control circuit controls said power storing section to accumulate as said second power redundancy of said first power to be supplied from said power supplying unit to said transmission power amplifier during said non-burst period.

3. The power circuit according to claim 2, wherein said control circuit controls said first power to be fed from said power supplying unit to said transmission power amplifier, by controlling an output current of said control circuit, said output current being fed from said power supplying unit to said transmission power amplifier.

4. The power circuit according to claim 3, wherein said transmission power amplifier is constructed to consume a given amount of power during one frame period of one burst period and one non-burst period, and wherein said control circuit is set to generate said output current to have a current value such that almost all of said given amount of power may be supplied to said transmission power amplifier.

5. The power circuit according to claim 2, wherein said power storing section supplies said second power to said transmission power amplifier by discharging when power needed to be consumed by said transmission power amplifier during said burst period is larger than said first power being supplied under control of said control circuit, and wherein said control circuit exerts control so that said power storing section having discharged during said burst period is charged to accumulate redundancy of said first power as said second power when power to be consumed by said transmission power amplifier during said non-burst period is smaller than said first power being supplied under control of said control circuit.

6. The power circuit according to claim 1, further comprising a delay device to delay a rising and falling of an output current of said power supplying unit at time of start and end of said burst period.

7. The power circuit according to claim 1, wherein said power storing section includes an electrical double layer capacitor.

8. The power circuit according to claim 7, wherein said electrical double layer capacitor has unit cells constructed as a capacitor of sheet-shaped electrical double layer structure forming stacked cells in which arbitrary numbers of said unit cells are stacked in a layer arrangement, to provide a specified withstand voltage and electrostatic capacity.

9. The power circuit according to claim 1, wherein said transmission signal is transmitted by a TDMA (Time Division Multiple Access) or TDD (Time Division Duplex) communication method.

10. A communication device comprising:

a transmission power amplifier to amplify a transmission signal having a burst period and a non-burst period occurring alternately in a repeated manner; and a power circuit comprising:

a power supplying unit to supply a first power to said transmission power amplifier, and a power storing section to accumulate, as a second power to power said transmission power amplifier during said burst period, of said first power to said transmission power amplifier during said non-burst period, and to feed the accumulated second power to said transmission power amplifier in addition to said first power being supplied from said power supplying unit to said transmission power amplifier during said burst period, wherein said power storing section is configured to be charged, when a voltage of said power storing section becomes lower than a voltage of said power supplying unit during said burst period, until a voltage of said power storing section becomes almost equal to a voltage of said power supplying unit during said non-burst period occurring subsequent to said burst period.

11. A power circuit to be used in a communication device comprising a transmission power amplifier to amplify a transmission signal having a burst period and a non-burst period occurring alternately in a repeated manner and with a load circuit to consume power required for performing operations, said power circuit comprising:

a power supplying unit to supply a first power to said transmission power amplifier and said load circuit;

a voltage monitoring section to monitor an output voltage of said power supplying unit and to inform a user of a drop of said output voltage, when said output voltage lowers to a specified reference level; and a power storing section to accumulate as a second power redundancy of said first power to be supplied from said power supplying unit to said transmission power amplifier during said non-burst period, and to feed the accumulated second power to said transmission power amplifier in addition to said first power being supplied from said power supplying unit to said transmission power amplifier during said burst period.

12. The power circuit according to claim 11, wherein said transmission power amplifier has a lower limit value of a first operating voltage to normally operate said transmission power amplifier, said load circuit has a lower limit value of a second operating voltage to normally operate said load circuit, said lower limit value of said second operating voltage is set to be higher than said lower limit value of said first operating voltage, said reference level is set to be not less than said lower limit value of said second operating voltage, and said power supplying unit is made up of a battery or a direct current power source in which in which an upper limit value is imposed on a current to be output therefrom.

13. The power circuit according to claim 11, wherein said power storing section is so configured as to be charged, when a voltage of said power storing section becomes lower than that of said power supplying unit during said burst period, until a voltage of said power storing section becomes almost equal to a voltage of said power supplying unit during said non-burst period occurring subsequent to said burst period.

14. The power circuit according to claim 11, further comprising:
a control circuit to control said first power to be fed from said power supplying unit to said transmission power amplifier,
wherein said power storing section accumulates as said second power redundancy of said first power to be supplied from said power supplying unit to said transmission power amplifier under control of said control circuit during said non-burst period.

15. The power circuit according to claim 14, wherein said control circuit controls said first power to be fed from said power supplying unit to said transmission power amplifier, by controlling an output current of said control circuit, said output current being fed from said power supplying unit to said transmission power amplifier.

16. The power circuit according to claim 14, wherein said output current of said control circuit is set to have a current value such that almost all amount of power needed to be consumed by said transmission power amplifier during one frame period being made up of one burst period and one non-burst period may be supplied to said transmission power amplifier.

17. The power circuit according to claim 14,
wherein said power storing unit supplies said second power to said transmission power amplifier by discharging when power needed to be consumed by said transmission power amplifier during said burst period is larger than said first power being supplied under control of said control circuit, and wherein said control circuit exerts control so that said power storing section having discharged during said burst period is charged to accumulate redundancy of said first power as said second power when power to be consumed by said transmission power amplifier during said non-burst period is smaller than said first power being supplied under control of said control circuit.

18. The power circuit according to claim 11, further comprising a delay device to delay a rising and falling of an output current of said power supplying unit at time of start and end of said burst period.

19. The power circuit according to claim 11, wherein said power storing section is made up of an electrical double layer capacitor.

20. The power circuit according to claim 19, wherein said electrical double layer capacitor has unit cells constructed as a capacitor of sheet-shaped electrical double layer structure which make up stacked cells in which arbitrary numbers of said unit cells are stacked in layer so as to be able to provide a specified withstand voltage and electrostatic capacity.

21. The power circuit according to claim 11, wherein said transmission signal is transmitted by a TDMA (Time Division Multiple Access) or TDD (Time Division Duplex) communication method.

22. A communication device comprising:
a transmission power amplifier to amplify a transmission signal having a burst period and a non-burst period occurring alternately in a repeated manner;
a load circuit to consume power required for performing operations, and
a power circuit comprising:
a power supplying unit to supply a first power to said transmission power amplifier and said load circuit;
a voltage monitoring section to monitor an output voltage of said power supplying unit and to inform a user of a drop of said output voltage, when said output voltage lowers to a specified reference level; and a power storing section to accumulate as a second power redundancy of said first power to be supplied from said power supplying unit to said transmission power amplifier during said non-burst period, and to feed the accumulated second power to said transmission power amplifier in addition to said first power being supplied from said power supplying unit to said transmission power amplifier during said burst period.

* * * * *